(12) United States Patent
Ohtake et al.

(10) Patent No.: US 8,479,899 B2
(45) Date of Patent: Jul. 9, 2013

(54) DAMPER, AND ELECTRONIC COMPONENT AND ELECTRONIC APPARATUS EQUIPPED WITH THE DAMPER

(75) Inventors: Masataka Ohtake, Tokyo (JP);
Masayuki Itakura, Tokyo (JP)

(73) Assignee: Polymatech Co., Ltd., Tokyo (JP)

( * ) Notice: Subject to any disclaimer, the term of this patent is extended or adjusted under 35 U.S.C. 154(b) by 1099 days.

(21) Appl. No.: 12/081,330

(22) Filed: Apr. 15, 2008

(65) Prior Publication Data

US 2008/0302622 A1   Dec. 11, 2008

(30) Foreign Application Priority Data

Apr. 16, 2007  (JP) .................................. 2007-107573

(51) Int. Cl.
*F16F 7/104*  (2006.01)
(52) U.S. Cl.
USPC ........... 188/379; 188/129; 188/315; 188/381; 267/141; 267/141.2; 267/141.3; 267/141.4; 267/136; 267/152; 267/153; 248/188.8; 248/188.9; 248/632; 248/635; 248/636; 361/679.36; 361/695; 361/804; 361/810
(58) Field of Classification Search
USPC ................ 267/140, 141, 140.15, 141.4, 153, 267/139, 147; 188/379; 248/188.9, 188.8, 248/188.91, 346.11, 560, 615, 677, 519; 16/42 R, 42 T; 361/679.57, 679.58, 679.31, 679.36, 361/679.48, 679.46, 679.33, 704, 807, 810, 361/684–695, 679.34, 679.35; 174/138 E, 174/138 G; 411/178, 292
IPC ...................................................... F16F 15/00
See application file for complete search history.

(56) References Cited

U.S. PATENT DOCUMENTS

| | | | | |
|---|---|---|---|---|
| 3,350,042 A * | 10/1967 | Stewart et al. | ............. | 267/141.4 |
| 5,153,052 A * | 10/1992 | Tanaka et al. | ................. | 428/212 |
| 6,017,185 A * | 1/2000 | Kuo | .............................. | 415/177 |
| 6,351,380 B1 * | 2/2002 | Curlee et al. | .................. | 361/695 |
| 6,894,897 B1 * | 5/2005 | Nagurny et al. | ............. | 361/695 |
| 6,915,993 B2 * | 7/2005 | O'Leary | .................... | 248/188.9 |
| 7,234,199 B2 * | 6/2007 | Bushey | ........................ | 16/42 R |
| 2002/0021655 A1 | 2/2002 | Shin | | |
| 2002/0084400 A1 * | 7/2002 | Ribeiro | ........................ | 248/519 |
| 2007/0086162 A1 * | 4/2007 | Chang | ........................... | 361/695 |

(Continued)

FOREIGN PATENT DOCUMENTS

| | | |
|---|---|---|
| CN | 1341939 A | 3/2002 |
| CN | 2566415 Y | 8/2003 |

(Continued)

OTHER PUBLICATIONS

First page of Chinese Office Action from CN Patent App. No. 200810093036.3 (Feb. 9, 2011).

(Continued)

*Primary Examiner* — Robert A Siconolfi
*Assistant Examiner* — San Aung
(74) *Attorney, Agent, or Firm* — Cermak Nakajima LLP; Tomoko Nakajima

(57) ABSTRACT

Disclosed is a damper that is easy to mount and capable of attenuating to a sufficient degree a vibration generated by an electronic component; also disclosed are an electronic component and an electronic apparatus that are provided with such a damper. A mounting insertion portion is provided with a hard portion maintaining the configuration of the mounting insertion portion.

21 Claims, 16 Drawing Sheets

U.S. PATENT DOCUMENTS

| | | | |
|---|---|---|---|
| 2007/0120301 A1* | 5/2007 | Domen et al. | 267/152 |
| 2007/0153477 A1* | 7/2007 | Liang | 361/695 |
| 2007/0237602 A1* | 10/2007 | Xia et al. | 411/178 |

FOREIGN PATENT DOCUMENTS

| | | |
|---|---|---|
| CN | 2757334 Y | 2/2006 |
| JP | 48-77584 U | 9/1973 |
| JP | 49-147486 U | 12/1974 |
| JP | 50-23771 Y1 | 7/1975 |
| JP | 54-54792 U | 4/1979 |
| JP | 1-163236 U | 11/1989 |
| JP | 40-5442 Y2 | 2/1992 |
| JP | 09-270975 A | 10/1997 |
| JP | 2000-027799 A | 1/2000 |
| JP | 2005-265158 A | 9/2005 |

OTHER PUBLICATIONS

Office Action from Japanese Patent App. No. 2007-107573 (Jul. 5, 2011).

* cited by examiner

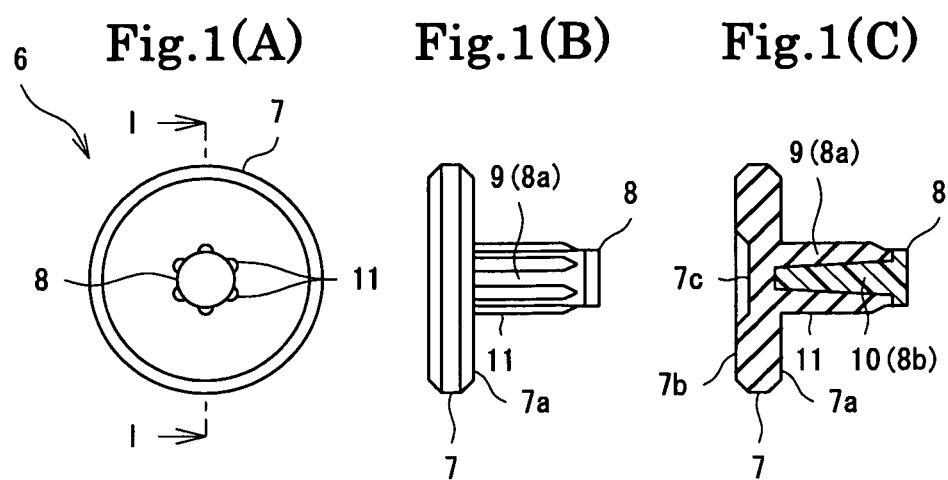
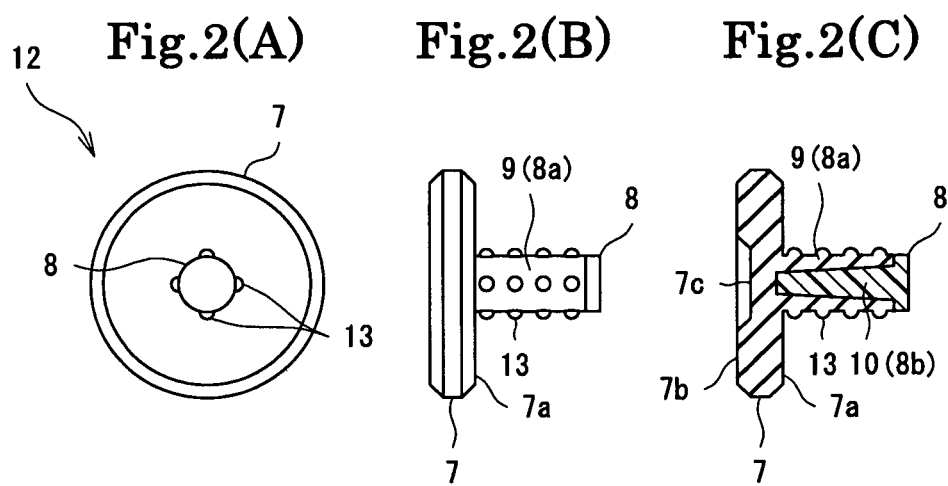

Fig.3(A) Fig.3(B) Fig.3(C)
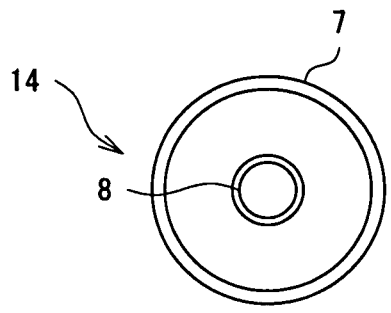 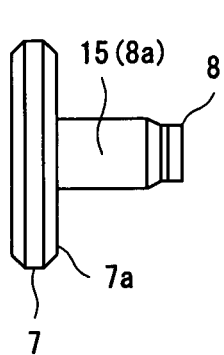 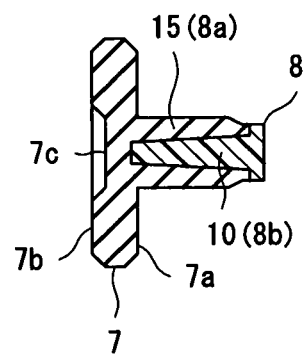
Fig.4(A) Fig.4(B) Fig.4(C)
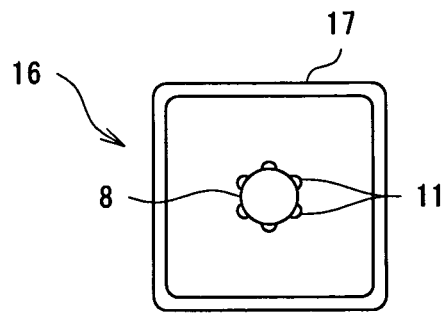 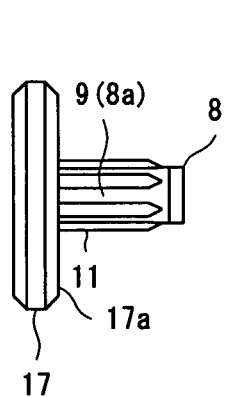 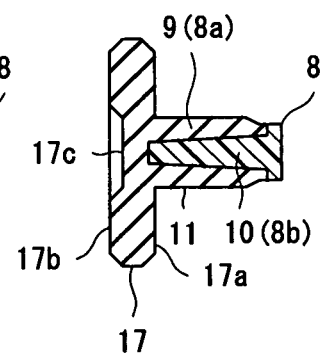
Fig.5(A) Fig.5(B) Fig.5(C)
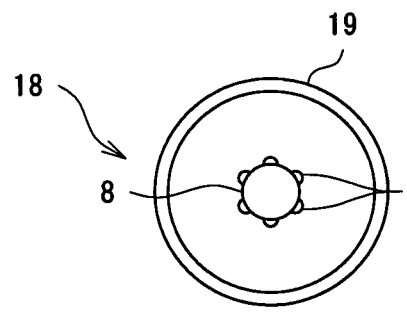 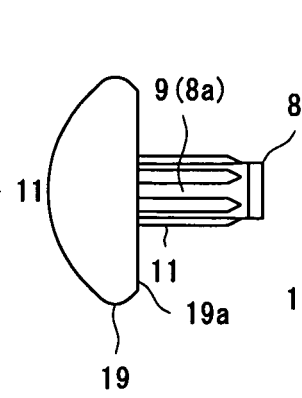 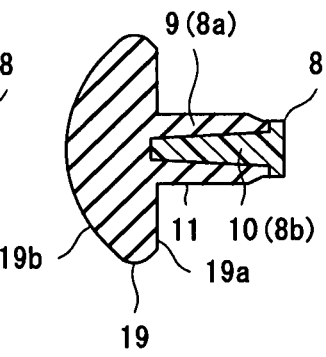

Fig.6(A) Fig.6(B) Fig.6(C)
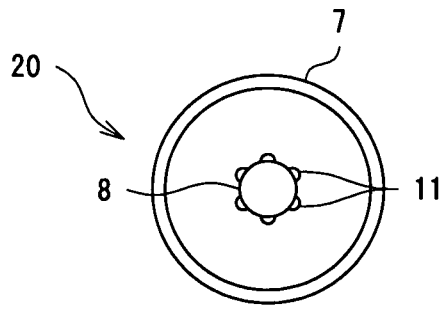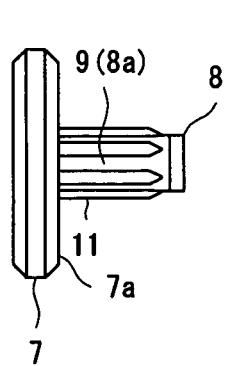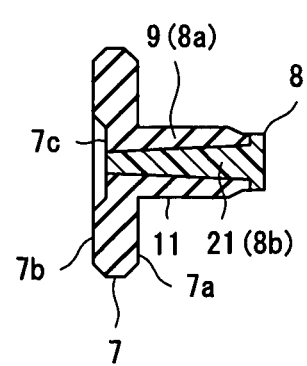
Fig.7(A) Fig.7(B) Fig.7(C)
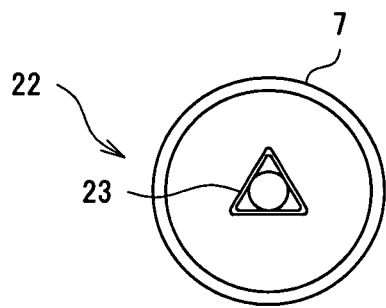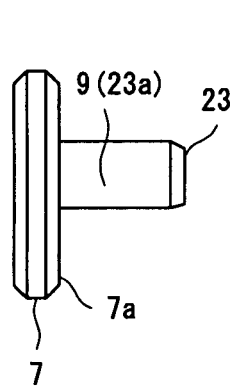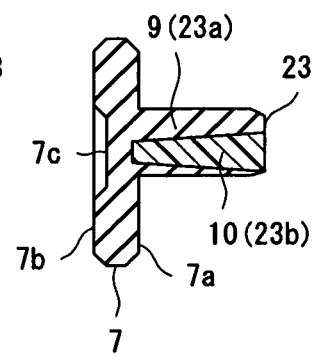
Fig.8(A) Fig.8(B) Fig.8(C)
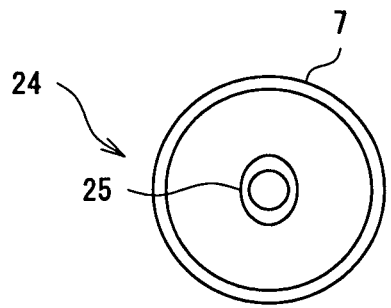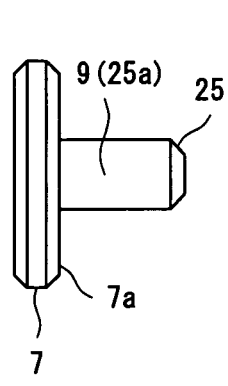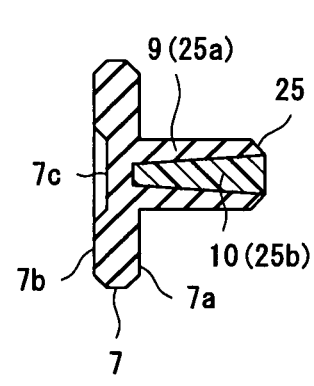

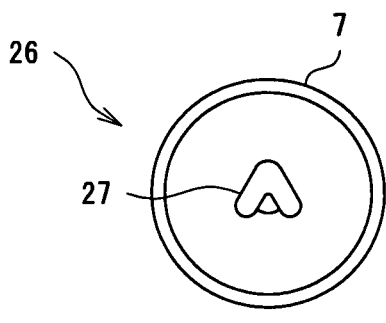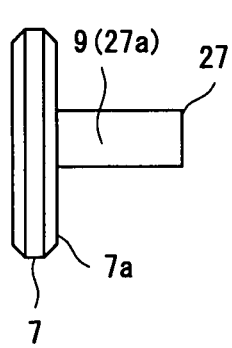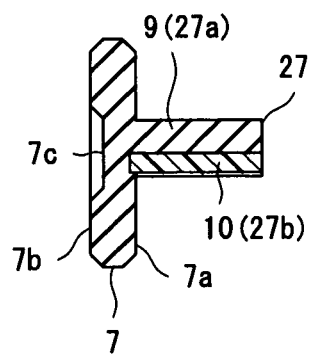
Fig.9(A)  Fig.9(B)  Fig.9(C)
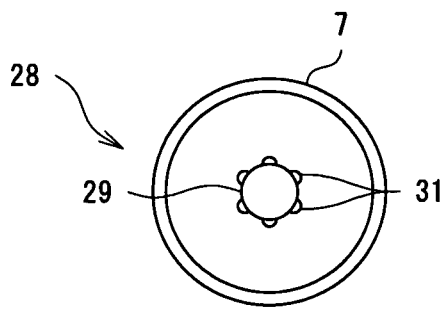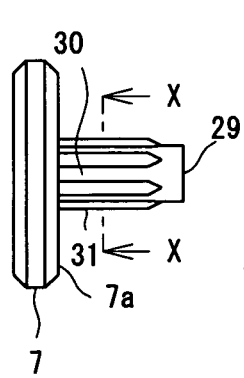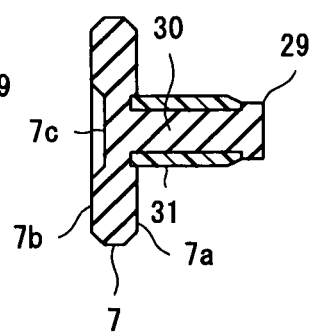
Fig.10(A)  Fig.10(B)  Fig.10(C)
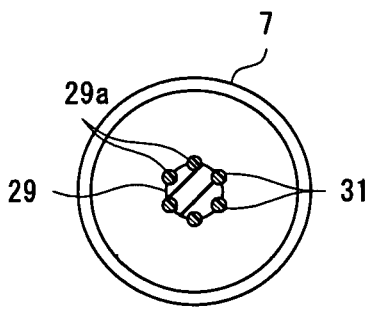
Fig.10(D)

Fig.13(A) Fig.13(B) Fig.13(C)
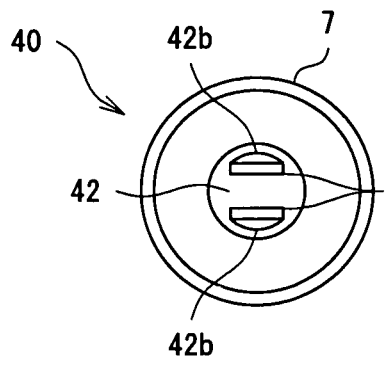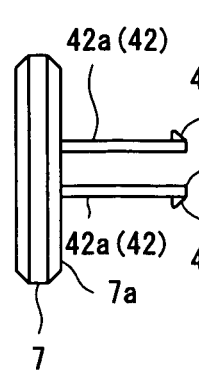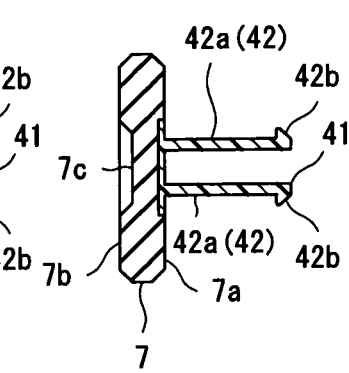
Fig.14(A) Fig.14(B) Fig.14(C)
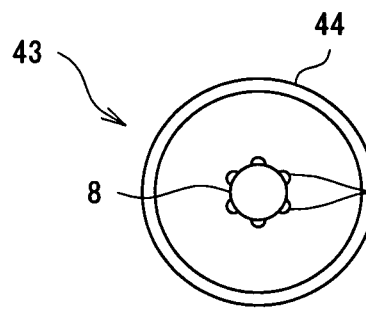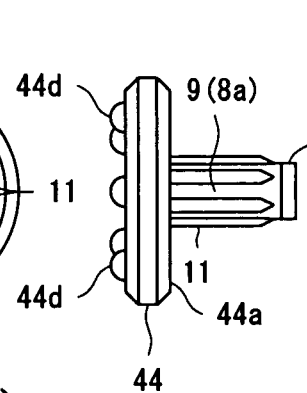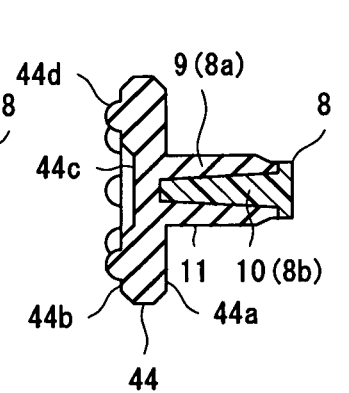
Fig.14(D)
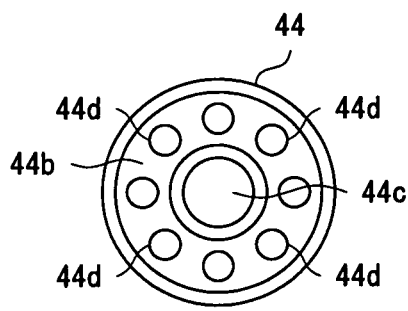

Fig.17(A) Fig.17(B) Fig.17(C)
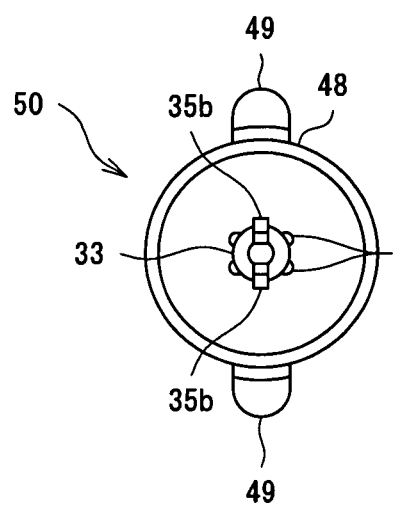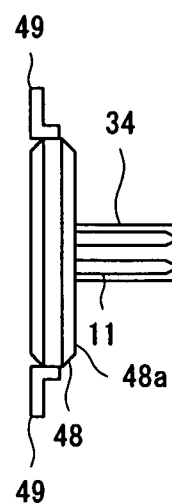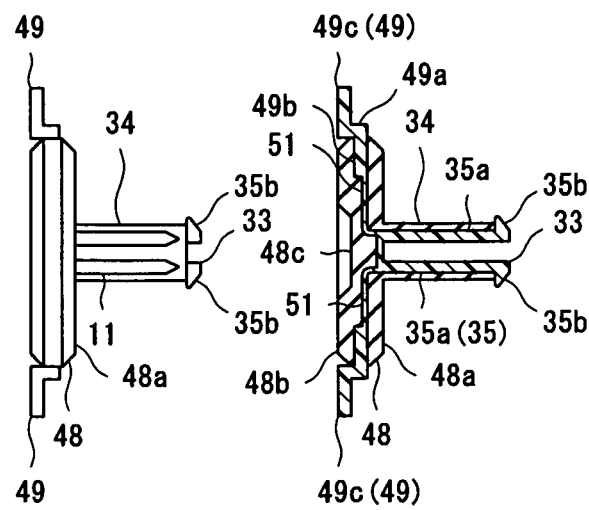
Fig.18(A) Fig.18(B) Fig.18(C)
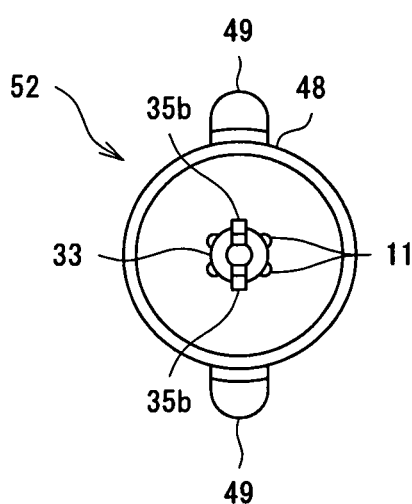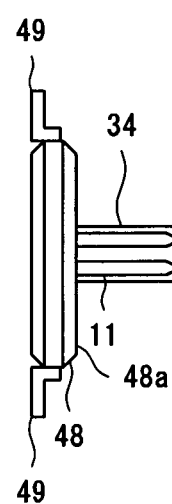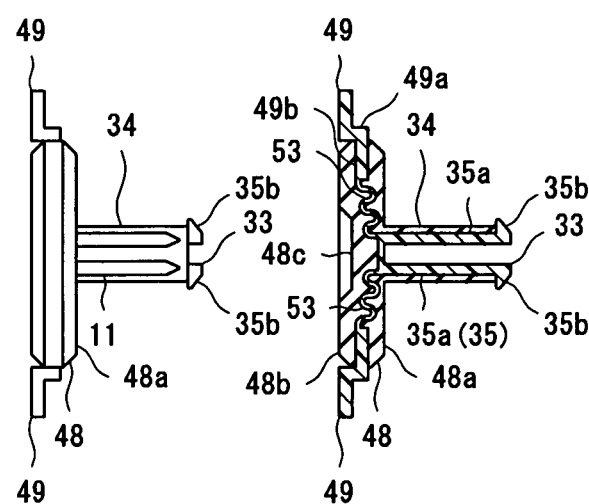

Fig.20
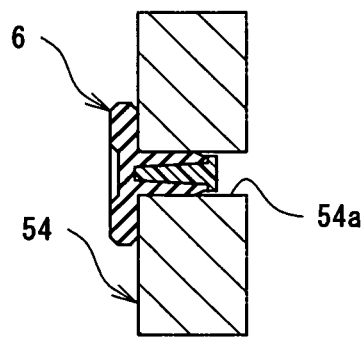
Fig.21(A)             Fig.21(B)
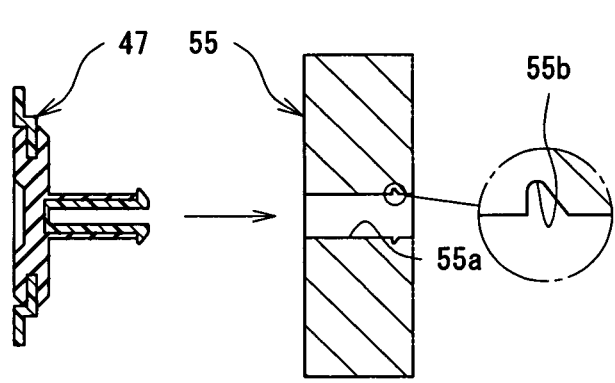   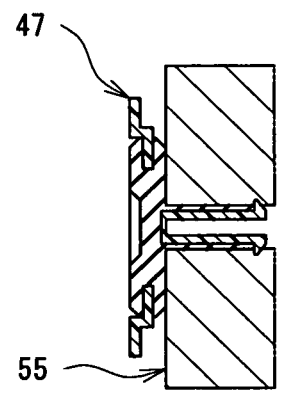
Fig.22(A)             Fig.22(B)
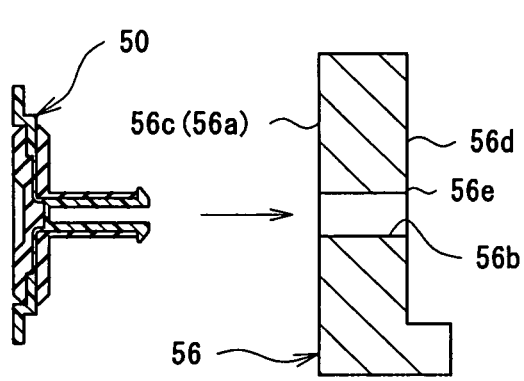   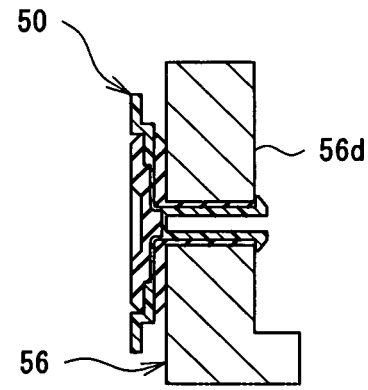

DAMPER, AND ELECTRONIC COMPONENT AND ELECTRONIC APPARATUS EQUIPPED WITH THE DAMPER

BACKGROUND OF THE INVENTION

1. Field of the Invention

The present invention relates to a vibration attenuating technique for an electronic component used in an electronic apparatus, such as a personal computer or a projector and, more particularly, to a damper which attenuates a vibration generated by the electronic component to make it hard for the vibration to be transmitted to the casing of an electronic apparatus, and to an electronic component and an electronic apparatus that are equipped with such a damper.

2. Description of the Related Art

An electronic component generating vibration is mounted in an electronic apparatus such as a personal computer or a projector. For example, an electronic component such as a cooling fan or a disk device is equipped with a motor for a rotary drive member; when the motor rotates, a vibration is generated. When this vibration is transmitted to the casing of the electronic apparatus, the electronic apparatus as a whole vibrates, and there is a fear of noise being generated and a fear of failure of the electronic apparatus being incurred.

In view of this, to make it hard for a vibration generated by an electronic component to be transmitted to the casing of an electronic apparatus, JP 09-270975 A, for example, discloses a structure in which a cooling fan is fixed to a casing by screws, with a ring-like vibration-proof rubber member being held between the cooling fan and the casing. Further, JP 2000-27799 A discloses a structure in which a cylindrical rubber bush mounted to a cooling fan mounting portion is mounted to a casing by screws.

Further, there also exists a damper 3 which needs no fixation by screws. As shown in FIGS. 28A through 28C, the damper 3 is equipped with a disc portion 1 and a mounting insertion portion 2 protruding from the center of the plate surface of the disc portion 1; as shown in FIG. 29, the mounting insertion portion 2 of the damper 3 is inserted into a mounting hole 4a of a cooling fan 4, and the cooling fan 4 is elastically supported and fixed to a casing 5, with the disc portion 1 abutting the casing 5.

While in the ring-like vibration-proof rubber member disclosed in JP 09-270975 A it is possible to attenuate a vibration in the axial direction of the screws, a sufficient attenuation effect cannot be exerted with respect to a vibration in a direction perpendicular to the axis; further, the fixation is effected by screws, so the operation of mounting the cooling fan is a bother. The cylindrical rubber bush as disclosed in JP 2000-27799 A is capable of attenuating vibration in different directions; however, as in the case of JP 09-270975 A, due to the fixation by screws, the operation of mounting the cooling fan is a bother. Further, in the damper 3 as shown in FIGS. 28A through 28C, using a flexible material of high vibration attenuation property may result in deformation of the mounting insertion portion 2 as shown in FIG. 29, making it impossible for the mounting insertion portion 2 to be reliably inserted into the mounting hole 4a of the cooling fan 4; if the cooling fan 4 is fixed to the casing 5 in this state, a sufficient attenuation effect is not to be expected.

SUMMARY OF THE INVENTION

The present invention has been made in view of the above problems in the prior art. It is accordingly an object of the present invention to provide a damper which is easy to mount and which is capable of attenuating to a sufficient degree a vibration generated by an electronic component, and an electronic component and an electronic apparatus that are equipped with such a damper.

In order to achieve the above-mentioned object, the present invention has the following structure. That is, the present invention provides a damper including: a vibration attenuating portion formed of a rubber-like elastic material; and a mounting insertion portion protruding from the vibration attenuating portion, with the mounting insertion portion being inserted into a mounting hole formed in an electronic component generating a vibration within an electronic apparatus, to thereby elastically support the electronic component, in which the mounting insertion portion is equipped with a hard portion maintaining the configuration of the mounting insertion portion.

In the present invention, the mounting insertion portion is equipped with a hard portion maintaining the configuration of the mounting insertion portion. Thus, it is possible to make it hard for the mounting insertion portion to be deformed, making it possible for the mounting insertion portion to be inserted easily and reliably into a mounting hole formed in an electronic component. Thus, a soft material of high vibration attenuation effect can be used as the damper material, making it possible to attenuate to a sufficient degree a vibration generated by the electronic component.

In the damper of the present invention, the mounting insertion portion may include a soft portion continuous with the vibration attenuating portion and exhibiting an E-hardness of 50 or less and the hard portion exhibiting an E-hardness of 70 or more. This makes it possible to press-fit the mounting insertion portion into the mounting hole by utilizing the compressive stress of the soft portion, so the damper can be easily inserted into the mounting hole and can be made relatively free from detachment. Thus, the mounting insertion portion can be reliably attached to the mounting hole. Further, it is possible to enhance the vibration attenuation property of the damper, making it possible to realize a damper of high attenuation property.

In the damper of the present invention, the rubber-like elastic member may be formed of a thermoplastic elastomer exhibiting an E-hardness as defined in JIS K6253 of 50 or less. This makes it possible to produce the damper by injection molding, thus making it possible to realize a low-cost damper. Further, the rubber-like elastic member may be formed of a thermosetting rubber exhibiting an E-hardness as defined in JIS K6253 of 50 or less. This makes it possible to enhance the heat resistance and wear resistance of the damper, making it possible to realize a damper of high durability. Further, the rubber-like elastic member may be formed of a gel material exhibiting an E-hardness as defined in JIS K6253 of 50 or less. This makes it possible to further enhance the vibration attenuation property of the damper, making it possible to realize a damper of high attenuation property.

In the damper of the present invention, which has a soft portion and a hard portion, it is possible to provide a convex fitting protrusion on the side surface of the mounting insertion portion. With this construction, if there is some variation in the hole diameter dimension of the mounting hole, such variation can be absorbed through compression of the fitting protrusion protruding from the side surface of the mounting insertion portion, thus enabling the mounting insertion portion to be easily inserted into the mounting hole and to be reliably attached. Thus, it is possible to attenuate to a sufficient degree a vibration generated by the electronic component.

The fitting protrusion may be provided on the surface of the mounting insertion portion as a ridge-like swelling continuous in the inserting direction. Since the fitting protrusion is provided on the surface of the mounting insertion portion as a ridge-like swelling continuous in the inserting direction, the fitting protrusion is not easily caught during insertion into the mounting hole, thus facilitating the insertion. Further, even if there is some variation in the hole diameter dimension of the mounting hole, some portion of the fitting protrusion is compressed, so the damper can be reliably attached. Thus, it is possible to attenuate to a sufficient degree a vibration generated by the electronic component.

In the damper of the present invention, which has a soft portion and a hard portion, the side surface of the mounting insertion portion may be formed by the soft portion. As compared with the hard portion, the soft portion exhibits a larger coefficient of friction, so, when the soft portion of the mounting insertion portion is thus brought into contact with the side surface of the mounting hole, the mounting insertion portion is relatively free from slippage and easier to deform than in the case in which the hard portion is brought into contact with the side surface of the mounting hole. Thus, the mounting insertion portion can be reliably attached to the mounting hole, making it possible to attenuate to a sufficient degree a vibration generated by the electronic component.

In the damper of the present invention, which has a soft portion and a hard portion, the hard portion may be exposed on the side surface of the mounting insertion portion. With this construction, the hard portion of the mounting insertion portion comes into contact with the side surface of the mounting hole, so the mounting insertion portion slips more easily on the side surface of the mounting hole. Thus, the insertion of the mounting insertion portion into the mounting hole is facilitated, making it possible for the mounting insertion portion to be reliably inserted into the mounting hole.

Further, it is also possible for the hard portion to form the side surface of the mounting insertion portion. As compared with the soft portion, the hard portion has a smaller coefficient of friction, so, when the hard portion of the mounting insertion portion is thus brought into contact with the side surface of the mounting hole, the mounting insertion portion slips more easily than in the case in which the soft portion is in contact with the side surface of the mounting hole. Thus, the insertion of the mounting insertion portion into the mounting hole is facilitated.

Further, in the damper of the present invention, the mounting insertion portion may be formed by the hard portion, which is more rigid than the vibration attenuating portion. In this case, it is desirable for the mounting insertion portion to have a spring structure. With this construction, even if there is some variation in the hole diameter dimension of the mounting hole, such variation can be absorbed by resilient deformation of the hard portion, making it possible for the mounting insertion portion to be reliably attached to the mounting hole. Further, because the hard portion comes into contact with the side surface of the mounting hole, it is easier for the mounting insertion portion to slip on the side surface of the mounting hole. Thus, the insertion of the mounting insertion portion into the mounting hole is facilitated, enabling it to be reliably inserted into the mounting hole.

In the damper of the present invention, the hard portion may have a lock portion to be engaged with an engagement portion provided in the electronic component. With this construction, the mounting insertion portion is not easily detached from the mounting hole, making it possible for the mounting insertion portion to be reliably attached to the mounting hole. Thus, it is possible to attenuate to a sufficient degree a vibration generated by the electronic component.

In the damper of the present invention, the vibration attenuating portion may have on the surface of the side opposite to the mounting insertion portion a contact portion to be brought into contact with the interior of an electronic apparatus. With this construction, it is possible to reduce the apparent hardness of the vibration attenuating portion, making it possible to enhance the vibration attenuating effect of the vibration attenuating portion. Further, the contact area between the vibration attenuating portion and an accommodating portion or the like within the electronic apparatus is reduced, so it is possible to reduce the friction therebetween. Thus, sliding accommodation of the electronic component equipped with the damper in the accommodating portion is facilitated.

In the damper of the present invention which has the contact portion, the contact portion may be formed of a hard resin. This helps to reduce the friction between the contact portion and the accommodating portion or the like, whereby sliding accommodation of the electronic component equipped with the damper in the accommodating portion is facilitated.

In the damper of the present invention, the vibration attenuating portion may have a protruding portion coming into contact with the interior of the electronic apparatus. It is desirable for this protruding portion to be formed of hard resin; since this protruding portion is brought into contact with the interior of the electronic apparatus, it is possible to use the protruding portion as a mounting guide, making it possible to accurately perform positioning on the damper with respect to the interior of the electronic apparatus. Thus, the electronic component can be accommodated in a highly precise position.

Further, in the damper of the present invention, the hard portion may exhibit conductivity and have a connecting portion coming into contact with the electronic component, and the vibration attenuating portion may have a conductive protruding portion coming into contact with the interior of the electronic apparatus and a conductive buffer portion electrically connecting the hard portion with the protruding portion and buffering a vibration transmitted from the hard portion. With this construction, it is possible to connect the electronic component electrically to the accommodating portion or the like inside the electronic apparatus, making it possible to connect the ground of the electronic component to the casing of the electronic apparatus via the accommodating portion. The conductive member has rigidity and easily transmits vibration; in the present invention, however, there is provided between the hard portion and the protruding portion a buffer portion buffering vibration transmitted from the hard portion, so it is possible to make it hard for a vibration of the electronic component transmitted to the hard portion to be transmitted to the accommodating portion. Thus, it is possible to attenuate to a sufficient degree a vibration generated by the electronic component while electrically connecting the electronic component and the accommodating portion to each other.

Also, the present invention provides an electronic component generating a vibration inside an electronic apparatus, including a vibration attenuating portion of the damper provided on an external surface with a mounting insertion portion of the damper according to any one of the above-mentioned aspects of the invention being inserted into a mounting hole formed in the external surface.

In the electronic component of the present invention, the mounting insertion portion of a damper according to any one of the above-mentioned aspects of the invention is inserted into the mounting hole provided in the external surface thereof, and the vibration attenuating portion of the damper is provided on the external surface, so the mounting insertion portion of the damper can be easily and reliably inserted into the mounting hole formed in the electronic component. Thus, it is possible to use as the damper material a soft material having a high vibration attenuating effect, making it possible to attenuate to a sufficient degree a vibration generated by the electronic component.

In the electronic component of the present invention, it is possible to provide a groove-like engagement portion in the mounting hole, locking a lock portion of the damper to the engagement portion to thereby fix the damper in position. This helps to make it hard for a damper according to any one of the above aspects of the invention to be detached from the mounting hole, making it possible to attach the damper reliably to the mounting hole. Thus, it is possible to attenuate to a sufficient degree a vibration generated by the electronic component.

Also, the present invention provides an electronic apparatus including an electronic component generating a vibration inside a casing, in which a mounting insertion portion of the damper according to any one of the above-mentioned aspects of the invention is inserted into a mounting hole provided in an external surface, to thereby attach the damper, and in which the electronic component elastically supported by a vibration attenuating portion of the damper is provided inside the casing.

In the electronic apparatus of the present invention, the mounting insertion portion of a damper according to any one of the above-mentioned aspects of the invention is inserted into the mounting hole provided in the external surface thereof to thereby attach the damper, and there is provided in an accommodating portion or the like inside the casing an electronic component elastically supported by the vibration attenuating portion of the damper, so it is possible to attenuate to a sufficient degree a vibration generated by the electronic component, thus making it hard for the vibration thereof to be transmitted to the electronic apparatus.

In the electronic apparatus of the present invention, any one of the above-mentioned dampers is attached to the electronic component, and it is possible to provide a connecting member electrically connecting the electronic component and the casing to each other. With this construction, the connecting member is formed by the hard portion, the buffer portion, and the protruding portion, and it is possible to connect the electronic component electrically to the accommodating portion or the like inside the casing, making it possible to connect the ground of the electronic component to the casing of the electronic apparatus via the accommodating portion. The conductive member has rigidity and easily transmits vibration; in the present invention, however, a buffer portion for buffering vibration is provided on a part of the connecting member, so it is possible to make it hard for vibration of the electronic component to be transmitted to the accommodating portion via the connecting member. Thus, it is possible to attenuate to a sufficient degree a vibration generated by an electronic component while electrically connecting the electronic component and the casing to each other.

In the damper, and the electronic component and the electronic apparatus equipped with the damper of the present invention, it is possible to insert the mounting insertion portion easily and reliably into the mounting hole formed in the electronic component. Thus, it is possible to use as the damper material a soft material exhibiting a high vibration attenuating effect, making it possible to attenuate to a sufficient degree a vibration generated by the electronic component. Thus, it is possible to make it hard for any vibration generated by the electronic component to be transmitted to the electronic apparatus.

The above description of the present invention should not be construed restrictively; the advantages, features, and uses of the present invention become more apparent from the following description given with reference to the accompanying drawings. Further, it should be understood that all modifications made without departing from the gist of the present invention are to be covered by the scope of the present invention.

BRIEF DESCRIPTION OF THE DRAWINGS

In the accompanying drawings:

FIGS. 1A through 1C are explanatory views of a damper according to a first embodiment, of which FIG. 1A is a plan view of the damper, FIG. 1B is a side view of the damper, and FIG. 1C is a sectional view taken along the line I-I of FIG. 1A;

FIGS. 2A through 2C are explanatory views of a damper according to a first modification of the first embodiment, of which FIG. 2A is a plan view of the damper, FIG. 2B is a side view of the damper, and FIG. 2C is a sectional view, corresponding to FIG. 1C, of the damper;

FIGS. 3A through 3C are explanatory views of a damper according to a second modification of the first embodiment, of which FIG. 3A is a plan view of the damper, FIG. 3B is a side view of the damper, and FIG. 3C is a sectional view, corresponding to FIG. 1C, of the damper;

FIGS. 4A through 4C are explanatory views of a damper according to a third modification of the first embodiment, of which FIG. 4A is a plan view of the damper, FIG. 4B is a side view of the damper, and FIG. 4C is a sectional view, corresponding to FIG. 1C, of the damper;

FIGS. 5A through 5C are explanatory views of a damper according to a fourth modification of the first embodiment, of which FIG. 5A is a plan view of the damper, FIG. 5B is a side view of the damper, and FIG. 5C is a sectional view, corresponding to FIG. 1C, of the damper;

FIGS. 6A through 6C are explanatory views of a damper according to a fifth modification of the first embodiment, of which FIG. 6A is a plan view of the damper, FIG. 6B is a side view of the damper, and FIG. 6C is a sectional view, corresponding to FIG. 1C, of the damper;

FIGS. 7A through 7C are explanatory views of a damper according to a sixth modification of the first embodiment, of which FIG. 7A is a plan view of the damper, FIG. 7B is a side view of the damper, and FIG. 7C is a sectional view, corresponding to FIG. 1C, of the damper;

FIGS. 8A through 8C are explanatory views of a damper according to a seventh modification of the first embodiment, of which FIG. 8A is a plan view of the damper, FIG. 8B is a side view of the damper, and FIG. 8C is a sectional view, corresponding to FIG. 1C, of the damper;

FIGS. 9A through 9C are explanatory views of a damper according to an eighth modification of the first embodiment, of which FIG. 9A is a plan view of the damper, FIG. 9B is a side view of the damper, and FIG. 9C is a sectional view, corresponding to FIG. 1C, of the damper;

FIGS. 10A through 10D are explanatory views of a damper according to a second embodiment, of which FIG. 10A is a plan view of the damper, FIG. 10B is a side view of the damper, FIG. 10C is a sectional view, corresponding to FIG. 1C, of the damper, and FIG. 10D is a sectional view taken along the line X-X of FIG. 10B;

FIGS. 11A through 11C are explanatory views of a damper according to a third embodiment, of which FIG. 11A is a plan view of the damper, FIG. 11B is a side view of the damper, and FIG. 11C is a sectional view, corresponding to FIG. 1C, of the damper;

FIGS. 12A through 12D are explanatory views of a damper according to a modification of the third embodiment, of which FIG. 12A is a plan view of the damper, FIG. 12B is a side view of the damper, FIG. 12C is a sectional view, corresponding to FIG. 1C, of the damper, and FIG. 12D is a sectional view taken along the line XII-XII of FIG. 12B;

FIGS. 13A through 13C are explanatory views of a damper according to a fourth embodiment, of which FIG. 13A is a plan view of the damper, FIG. 13B is a side view of the damper, and FIG. 13C is a sectional view, corresponding to FIG. 1C, of the damper;

FIGS. 14A through 14D are explanatory views of a damper according to a fifth embodiment, of which FIG. 14A is a plan view of the damper, FIG. 14B is a side view of the damper, FIG. 14C is a sectional view, corresponding to FIG. 1C, of the damper, and FIG. 14D is a plan view as seen from the opposite side of FIG. 14A;

FIGS. 15A through 15D are explanatory views of a damper according to a modification of the fifth embodiment, of which FIG. 15A is a plan view of the damper, FIG. 15B is a side view of the damper, FIG. 15C is a sectional view, corresponding to FIG. 1C, of the damper, and FIG. 15D is a plan view as seen from the opposite side of FIG. 15A;

FIGS. 16A through 16C are explanatory views of a damper according to a sixth embodiment, of which FIG. 16A is a plan view of the damper, FIG. 16B is a side view of the damper, and FIG. 16C is a sectional view, corresponding to FIG. 1C, of the damper;

FIGS. 17A through 17C are explanatory views of a damper according to a seventh embodiment, of which FIG. 17A is a plan view of the damper, FIG. 17B is a side view of the damper, and FIG. 17C is a sectional view, corresponding to FIG. 1C, of the damper;

FIGS. 18A through 18C are explanatory views of a damper according to a modification of the seventh embodiment, of which FIG. 18A is a plan view of the damper, FIG. 18B is a side view of the damper, and FIG. 18C is a sectional view, corresponding to FIG. 1C, of the damper;

FIG. 20 is an enlarged sectional view of the electronic component equipped with the damper according to the present invention;

FIGS. 21A and 21B are explanatory views of an electronic component equipped with another damper according to the present invention, of which FIG. 21A is an enlarged sectional view of a state prior to attachment of the damper, and FIG. 21B is an enlarged sectional view of a state after attachment of the damper;

FIGS. 22A and 22B are explanatory views of an electronic component equipped with still another damper according to the present invention, of which FIG. 22A is an enlarged sectional view of a state prior to attachment of the damper, and FIG. 22B is an enlarged sectional view of a state after attachment of the damper;

FIGS. 28A through 28C are explanatory views of a conventional damper, of which FIG. 28A is a plan view of the damper, FIG. 28B is a side view of the damper, and FIG. 28C is a sectional view taken along the line XXVIII-XXVIII of FIG. 28A.

DESCRIPTION OF THE PREFERRED EMBODIMENTS

Figure 11A:
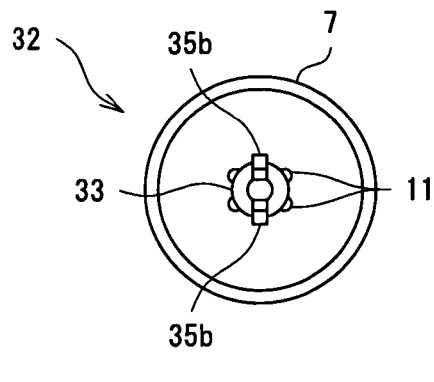

In the following, embodiments of the present invention are described with reference to the drawings. In the drawings, the reference numerals indicate portions and components. It should be noted that, regarding the members, materials, constructions, manufacturing methods, and effects common to the following embodiments, a redundant description thereof is omitted.

Embodiments of the Damper (FIGS. 1 Through 18)

First Embodiment (FIGS. 1A Through 1C): FIGS. 1A through 1C show a damper 6 according to a first embodiment of the present invention. FIG. 1A is a plan view of the damper 6, FIG. 1B is a side view of the damper 6, and FIG. 1C is a sectional view of the damper 6. The damper 6 of the first embodiment is equipped with a vibration attenuating portion 7 and a mounting insertion portion 8.

The vibration attenuating portion 7 is a portion for elastically supporting an electronic component within an accommodating portion of an electronic apparatus described below. The vibration attenuating portion 7 is formed in a disc-like configuration. From the center of one surface 7a of the vibration attenuating portion 7, there protrudes the mounting insertion portion 8, and, at the center of the other surface 7b, which is on the side opposite to the one surface 7a, there is formed a circular recess 7c.

The mounting insertion portion 8 is a portion to be inserted into a mounting hole of an electronic component. The mounting insertion portion 8 is formed in a columnar configuration continuous with the vibration attenuating portion 7, and has a soft portion 9 and a hard portion 10. Of those, the soft portion 9 is formed as a cylinder constituting a side surface portion 8a of the mounting insertion portion 8; further, on its surface, there are formed a plurality of (six in FIGS. 1A through 1C) fitting protrusions 11 swollen in a ridge-like fashion continuously in the inserting direction from its base end on the vibration attenuating portion 7 side toward its distal end. On the other hand, the hard portion 10 constitutes a central portion 8b of the mounting insertion portion 8 within the cylinder of the soft portion 9 and is exposed at the distal end of the mounting insertion portion 8.

The characteristics and the materials of the components of the damper 6 are described. The vibration attenuating portion 7 and the soft portion 9 of the mounting insertion portion 8 may be formed of a low-hardness rubber-like elastic material exhibiting a high vibration attenuating property. Its E-hardness according to JIS K6253 is 50 or less, preferably, 30 or less. When the E-hardness is higher than 50, the resultant vibration attenuating performance is rather insufficient; when it is 30 or less, an especially high vibration attenuation performance can be attained; through the combined use with the material of the hard portion 10, it provides a desired vibration attenuation characteristic. Regarding the vibration attenuation characteristic, mechanical loss tangent tan δ of 0.05 or more is desirable. If the loss factor is less than 0.05, there is a fear of a sufficient vibration attenuation characteristic not being attained. Regarding creeping characteristic, a compression set of 50% or less is desirable when it is left to stand for 22 hours in a 25% compression state and in a 70° C. atmosphere (JIS K6262). For a quality of material for the vibration attenuating portion 7, for example, there may be used a thermoplastic elastomer, a thermosetting rubber, or a gel material. As the thermoplastic elastomer, there are exemplified a styrene thermoplastic elastomer, an olefin thermoplastic elastomer, a polyurethane thermoplastic elastomer, a polyester thermoplastic elastomer, a vinyl chloride thermoplastic elastomer, a polyamide thermoplastic elastomer, and the like. As the thermosetting rubber, there are exemplified a silicone rubber, a natural rubber, a butadiene rubber, an isoprene rubber, a 1,2-polybutadiene rubber, a styrene butadiene rubber, a chloroprene rubber, a nitrile rubber, a hydrogenated nitrile rubber, a butyl rubber, a halogenated butyl rubber, an ethylene propylene rubber, a chlorinated polyethylene rubber, a chlorosulfonated polyethylene rubber, an acrylic rubber, an epichlorohydrin rubber, a fluorocarbon rubber, a urethane rubber, a phosphazene rubber, and the like. As the gel material, there are exemplified a urethane gel, an acrylic gel, a silicone gel, and the like. It is also possible to add flame retardant, lubricant, etc. to the above rubber-like elastic material. Use of a thermoplastic elastomer may lead to superior moldability and low-cost production; by use of a thermosetting rubber, high durability or strength and a satisfactory vibration attenuation characteristic may be attained; by use of a gel material, the superior vibration attenuation characteristic may be attained.

Regarding the characteristics of the hard portion 10, it exhibits an E-hardness as defined in JIS K6253 of 70 or more. When its E-hardness is less than 70, the hard portion is apt to bend at the time of insertion of the mounting insertion portion 8, and there is a fear of the insertion not being effected reliably. For a quality of material for the mounting insertion part 8, for example, there may be used a thermoplastic resin, a thermoplastic elastomer, a thermosetting rubber, a thermosetting resin, or a photo-curing resin. As the thermoplastic resin, there are exemplified ethylene α-olefin copolymers such as a polypropylene resin, a polyethylene resin, and an ethylene propylene copolymer, a polymethylpentene resin, a polyvinyl chloride resin, a polyvinylidene chloride resin, polyvinyl acetate resin, an ethylene vinyl acetate copolymer, a polyvinyl alcohol resin, a polyvinyl acetal resin, fluorocarbon polymers such as a polyvinylidene fluoride resin and a polytetrafluoroethylene, a polyethylene terephthalate resin, a polybutylene terephthalate resin, a polyethylene naphthalate resin, a polystyrene resin, a polyacrylonitrile resin, a styrene acrylonitrile copolymer, an acrylonitrile butadienestyrene resin, a polyphenylene ether resin, a modified polyphenylene ether resin, an aliphatic polyamide resin, an aromatic polyamide resin, a polyimide resin, a polyamide imide resin, polymethacrylic acid ester resins such as polymethylmethacylate, a polyacrylic resin, a polycarbonate resin, a polyphenylene sulfide resin, a polysulfone resin, a polyethersulfone resin, polyethernitrile resin, a polyether ketone resin, a polyketone resin, a liquid crystal polymer, an ionomer resin, and/or composite resins thereof. As the thermoplastic elastomer, there are exemplified a styrene thermoplastic elastomer, a olefin thermoplastic elastomer, a polyurethane thermoplastic elastomer, a polyester thermoplastic elastomer, vinyl chloride thermoplastic elastomer, a polyamide thermoplastic elastomer, and the like. As a thermosetting rubber, a silicone rubber, a natural rubber, a butadiene rubber, a isoprene rubber, 1,2-polybutadiene rubber, a styrene butadiene rubber, a chloroprene rubber, a nitrile rubber, a hydrogenated nitrile rubber, a butyl rubber, a halogenated butyl rubber, an ethylene propylene rubber, a chlorinated polyethylene rubber, a chlorosulfonated polyethylene rubber, an acrylic rubber, an epichlorohydrin rubber, a fluorocarbon rubber, a urethane rubber, a phosphazene rubber, and the like. As the thermosetting resin, there are exemplified an epoxy resin, an unsaturated polyester resin, a phenol resin, a urea resin, a melamine resin, a polyurethane resin, a silicone resin, and the like. As a photo-curing resin, there are exemplified a urethane acrylate resin, an ester acrylate resin, an epoxy acrylate resin, and the like.

Next, a method of manufacturing the damper 6 is described. The hard portion 10 is formed by molding, such as injection molding or press molding, and is transferred to a mold for molding the vibration attenuating portion 7 and the soft portion 9 to be integrally molded with the vibration attenuating portion 7 and the soft portion 9, whereby the damper 6 is obtained. In performing the integral molding, it is preferable to adopt insert molding or continuous two-color molding; in effecting fastening, there is adopted fusion welding in a melted state, bonding by an adhesive, or configurational connection. It is also possible to effect integration by adhesive after separate molding.

The effects of the damper 6 are described. In the damper 6, the mounting insertion portion 8 is equipped with the hard portion 10 which maintains its shape, so the mounting insertion portion 8 is less likely to be deformed, making it possible for the mounting insertion portion 8 to be inserted easily and reliably into a mounting hole formed in an electronic component described below. Thus, it is possible to use a soft material such as a gel material, which exhibits a high vibration attenuating effect, making it possible to attenuate to a sufficient degree a vibration generated by the electronic component.

Since the mounting insertion portion 8 is constituted of the soft portion 9 continuous with the vibration attenuating portion 7 and the hard portion 10, it is possible to press-fit the mounting insertion portion 8 into the mounting hole of the electronic component by utilizing the compressive stress of the soft portion 9. Thus, the damper 6 can be made relatively free from detachment from the mounting hole, making it possible to reliably attach the mounting insertion portion 8 to the mounting hole. Thus, it is possible to attenuate to a sufficient degree a vibration generated by the electronic component.

Since the soft portion 9 forms the side surface portion 8a of the mounting insertion portion 8, the soft portion 9 of the mounting insertion portion 8 comes into contact with the side surface of the mounting hole of the electronic component, thus making the mounting insertion portion less likely to slip than in the case in which the hard portion 10 comes into contact with the side surface of the mounting hole. Thus, the mounting insertion portion 8 can be reliably attached to the mounting insertion portion 8, making it possible to attenuate to a sufficient degree a vibration generated by the electronic component.

Since the thin and narrow fitting protrusions 11 are provided on the side surface of the mounting insertion portion 8 so as to extend from the base end toward the distal end, even when there is some variation in the hole diameter dimension of the mounting hole of the electronic component, such variation can be absorbed through compression of the fitting protrusions 11. Thus, the mounting insertion portion 8 can be reliably attached to the mounting hole, making it possible to attenuate to a sufficient degree a vibration generated by the electronic component.

First Modification of First Embodiment (FIGS. 2A Through 2C): FIGS. 2A through 2C show a damper 12 according to a first modification of the first embodiment. FIG. 2A is a plan view of the damper 12, FIG. 2B is a side view of the damper 12, and FIG. 2C is a sectional view of the damper 12. While in the damper 6 of the first embodiment there are adopted the thin and narrow fitting protrusions 11 extending from the base end toward the distal end, in the damper 12 of the first modification, it is possible to adopt semi-spherical fitting protrusions 13. As in the case of the fitting protrusions 11 of the damper 6, with this construction also, the fitting protrusions 13 of the damper 12 can absorb any variation in the hole diameter dimension of the mounting hole of the electronic component through compression.

Second Modification of First Embodiment (FIGS. 3A Through 3C): FIGS. 3A through 3C show a damper 14 according to a second modification of the first embodiment. FIG. 3A is a plan view of the damper 14, FIG. 3B is a side view of the damper 14, and FIG. 3C is a sectional view of the damper 14. While in the damper 6 of the first embodiment there are adopted the thin and narrow fitting protrusions 11 extending from the base end toward the distal end, in the damper 14 of the second modification, the fitting protrusions 11 are eliminated; instead, the outer diameter of a soft portion 15 of the mounting insertion portion 8 is enlarged, and the thickness of the soft portion 15 is made larger than the thickness of the soft portion 9. As in the case of the fitting protrusions 11 of the damper 6, with this construction also, the soft portion 15 of the damper 14 can absorb any variation in the hole diameter dimension of the mounting hole of the electronic component through compression.

Third Modification of First Embodiment (FIGS. 4A Through 4C): FIGS. 4A through 4C show a damper 16 according to a third modification of the first embodiment. FIG. 4A is a plan view of the damper 16, FIG. 4B is a side view of the damper 16, and FIG. 4C is a sectional view of the damper 16. While in the damper 6 of the first embodiment the disc-shaped vibration attenuating portion 7 is adopted, the damper 16 of the third modification may have a rectangular vibration attenuating portion 17. As in the case of the vibration attenuating portion 7 of the damper 6, with this construction also, the vibration attenuating portion 17 can elastically support the electronic component in the accommodating portion.

Fourth Modification of First Embodiment (FIGS. 5A Through 5C): FIGS. 5A through 5C show a damper 18 according to a fourth modification of the first embodiment. FIG. 5A is a plan view of the damper 18, FIG. 5B is a side view of the damper 18, and FIG. 5C is a sectional view of the damper 18. While the damper 6 of the first embodiment has the disc-shaped vibration attenuating portion 7, with the circular recess 7a being formed at the center of the other surface thereof, the damper 18 of the fourth modification may have a vibration attenuating portion 19 whose other surface is swollen at a center thereof in a dome-like fashion. As in the case of the vibration attenuating portion 7 of the damper 6, with this construction also, the vibration attenuating portion 19 of the damper 18 can elastically support the electronic component in the accommodating portion.

Fifth Modification of First Embodiment (FIGS. 6A Through 6C): FIGS. 6A through 6C show a damper 20 according to a fifth modification of the first embodiment. FIG. 6A is a plan view of the damper 20, FIG. 6B is a side view of the damper 20, and FIG. 6C is a sectional view of the damper 20. While in the damper 6 of the first embodiment the base end side of the hard portion 10 does not extend through the thickness of the vibration attenuating portion 7, the damper 20 of the fifth modification may have a hard portion 21 extending through the thickness of the vibration attenuating portion 7. As in the case of the hard portion 10 of the damper 6, with this construction also, the hard portion 21 of the damper 20 can make it hard for the mounting insertion portion to be deformed.

Sixth Modification of First Embodiment (FIGS. 7A Through 7C): FIGS. 7A through 7C show a damper 22 according to a sixth modification of the first embodiment. FIG. 7A is a plan view of the damper 22, FIG. 7B is a side view of the damper 22, and FIG. 7C is a sectional view of the damper 22. While the damper 6 of the first embodiment has the columnar mounting insertion portion 8, the damper 22 of the sixth modification may have a triangular-prism-shaped mounting insertion portion 23. A side surface portion 23a of the mounting insertion portion 23 is formed by the soft portion 9, and a central portion 23b thereof is formed by the hard portion 10. As in the case of the mounting insertion portion 8 of the damper 6, with this construction also, the mounting insertion portion 23 of the damper 22 can be inserted into the mounting hole of the electronic component.

Seventh Modification of First Embodiment (FIGS. 8A Through 8C): FIGS. 8A through 8C show a damper 24 according to a seventh modification of the first embodiment. FIG. 8A is a plan view of the damper 24, FIG. 8B is a side view of the damper 24, and FIG. 8C is a sectional view of the damper 24. While the damper 6 of the first embodiment has the columnar mounting insertion portion 8, the damper 24 of the seventh modification may have an elliptic-columnar-shaped mounting insertion portion 25. A side surface portion 25a of the mounting insertion portion 25 is formed by the soft portion 9, and a central portion 25b thereof is formed by the hard portion 10. As in the case of the mounting insertion portion 8 of the damper 6, with this construction also, the mounting insertion portion 25 of the damper 24 can be inserted into the mounting hole of the electronic component.

Eighth Modification of First Embodiment (FIGS. 9A Through 9C): FIGS. 9A through 9C show a damper 26 according to an eighth modification of the first embodiment. FIG. 9A is a plan view of the damper 26, FIG. 9B is a side view of the damper 26, and FIG. 9C is a sectional view of the damper 26. While the damper 6 of the first embodiment has the columnar mounting insertion portion 8, the damper 26 of the eighth modification may have a substantially-triangular-prism-shaped mounting insertion portion 27. A side surface portion 27a of the mounting insertion portion 27 is formed by the soft portion 9, and a central portion 27b thereof is formed by the hard portion 10. As in the case of the mounting insertion portion 8 of the damper 6, with this construction also, the mounting insertion portion 27 of the damper 26 can be inserted into the mounting hole of the electronic component.

Second Embodiment (FIGS. 10A Through 10D): FIGS. 10A through 10D show a damper 28 according to a second embodiment of the present invention. FIG. 10A is a plan view of the damper 28, FIG. 10B is a side view of the damper 28, FIG. 10C is a sectional view, corresponding to FIG. 1C, of the damper 28, and FIG. 10D is a sectional view taken along the line X-X of FIG. 10B. The damper 28 of the second embodiment differs from the damper 6 of the first embodiment in the construction of a mounting insertion portion 29. Otherwise, the second embodiment is of the same construction, operation, effects, and manufacturing method as the first embodiment.

Like the mounting insertion portion 8 of the first embodiment, the mounting insertion portion 29 is inserted into a mounting hole of an electronic component described below. Further, it includes a soft portion 30 continuous with the vibration attenuating portion 7 and a hard portion 31, and is formed in a columnar configuration. Of those, the soft portion 30 is formed as a solid column serving as the mounting insertion portion 29, and, in the side surface thereof, there are formed a plurality of (six in FIG. 10) thin and narrow recesses 29*a* extending from the base end toward the distal end. On the other hand, the hard portion 31 is formed as a thin and narrow substantially elliptic column, and is fixed to the recesses 29*a*. Further, the portion of the hard portion 31 exposed from the soft portion 30 corresponds to the fitting protrusions 11 formed on the mounting insertion portion 8 of the first embodiment.

The effect of the damper 28 of the second embodiment is described. In the damper 28, the hard portion 31 is exposed on the side surface of the mounting insertion portion 29, so the hard portion 31 is brought into contact with the side surface of the mounting hole of the electronic component to be able to easily slip thereon. Thus, the mounting insertion portion 29 can be easily and reliably inserted into the mounting hole.

Figure 11B:
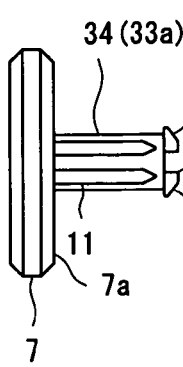
Figure 11C:
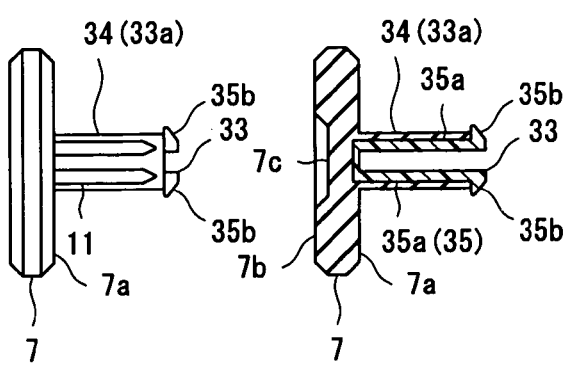

Third Embodiment (FIGS. 11A Through 11C): FIGS. 11A through 11C show a damper 32 according to a third embodiment of the present invention. FIG. 11A is a plan view of the damper 32, FIG. 11B is a side view of the damper 32, and FIG. 11C is a sectional view, corresponding to FIG. 1C, of the damper 32. The damper 32 of the third embodiment differs from the damper 6 of the first embodiment in the construction of a mounting insertion portion 33. Otherwise, the third embodiment is of the same construction, operation, effects, and manufacturing method as the first embodiment.

Like the mounting insertion portion 8 of the first embodiment, the mounting insertion portion 33 is inserted into a mounting hole of an electronic component described below, and is formed in a cylindrical configuration by a soft portion 34 continuous with the vibration attenuating portion 7 and a hard portion 35. Of those, the soft portion 34 is formed as a cylinder constituting a side surface portion 33*a* of the mounting insertion portion 33; further, on the side surface, there are formed a plurality of (four in FIG. 11) thin and narrow fitting protrusions 11 extending from the base end of the vibration attenuating portion 7 side toward the distal end. On the other hand, the hard portion 35 is fixed in position within the cylinder of the soft portion 34, and formed as two divisional members 35*a*. At the forward ends of the divisional members 35*a*, there are provided outwardly directed lock claws 35*b* serving as "lock portions", with pointed portions of the lock claws 35*b* protruding outwardly from the side surface portion 33*a* of the mounting insertion portion 33. The divisional members 35*a* are capable of resilient deformation through deflection.

The effects of the damper 32 of the third embodiment are described. In the damper 32, the lock claws 35*b* of the hard portion 35 can be engaged with engagement portions provided on the electronic component, thus making it hard for the mounting insertion portion 33 to be detached from the mounting hole. Thus, it is possible to reliably attach the mounting insertion portion 33 to the mounting hole, and to attenuate to a sufficient degree a vibration generated by the electronic component.

Figure 12A:
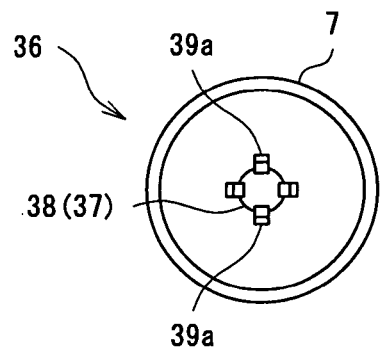
Figure 12B:
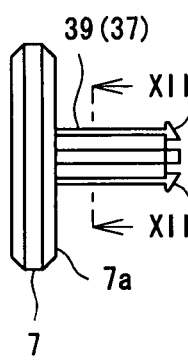
Figure 12C:
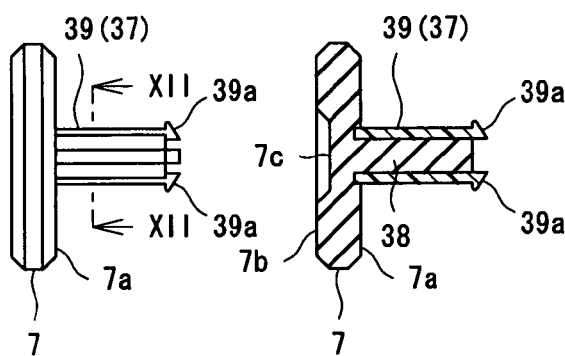
Figure 12D:
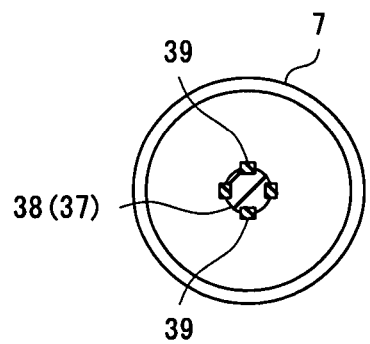

Modification of Third Embodiment (FIGS. 12A Through 12D): FIGS. 12A through 12D show a damper 36 according to a modification of the third embodiment. FIG. 12A is a plan view of the damper 36, FIG. 12B is a side view of the damper 36, FIG. 12C is a sectional view of the damper 36, and FIG. 12D is a sectional view taken along the line XII-XII of FIG. 12B. While the damper 32 of the third embodiment has the mounting insertion portion 33 with the cylindrical soft portion 34 within which the hard portion 35 is fixed in position, the damper 36 of this modification has a mounting insertion portion 37 with a soft portion 38 formed as a solid column to the side surface of which there are fixed a plurality of (four in FIG. 12) thin and narrow hard portions 39 extending from the base end toward the distal end. Further, the hard portions 39 correspond to the fitting protrusions 11 formed on the mounting insertion portion 8 of the first embodiment; at the forward ends thereof, outwardly directed lock claws 39*a* serving as "lock portions" may be provided. With this construction also, the lock claws 39*a* can be engaged with engagement portions provided in the electronic component, thus making it hard for the mounting insertion portion 37 to be detached from the mounting hole.

Fourth Embodiment (FIGS. 13A Through 13C): FIGS. 13A through 13C show a damper 40 according to a fourth embodiment of the present invention. FIG. 13A is a plan view of the damper 40, FIG. 13B is a side view of the damper 40, and FIG. 13C is a sectional view, corresponding to FIG. 1C, of the damper 40. The damper 40 of the fourth embodiment differs from the damper 6 of the first embodiment in the construction of a mounting insertion portion 41. Otherwise, the fourth embodiment is of the same construction, operation, effects, and manufacturing method as the first embodiment.

Like the mounting insertion portion 8 of the first embodiment, the mounting insertion portion 41 is inserted into a mounting hole of an electronic component; the mounting insertion portion 41 of this embodiment, however, is formed by a hard portion 42. The hard portion 42 includes two divisional members 42*a*, and outwardly directed lock claws 42*b* serving as "lock portions" are provided at the forward ends of the divisional members 42*a*. The divisional members 42*a* are capable of resilient deformation through deflection.

The effects of the damper 40 of the fourth embodiment are described. In the damper 40, the hard portion 42 constituting the mounting insertion portion 41 has a spring structure, and, if there is some variation in the hole diameter dimension of the mounting hole of the electronic component, such variation can be absorbed through resilient deformation of the hard portion 42. Thus, the mounting insertion portion 41 can be reliably attached to the mounting hole. Further, because the hard portion 42 is brought into contact with the side surface of the mounting hole, it is easier for the mounting insertion portion 41 to slip on the side surface of the mounting hole. Thus, the mounting insertion portion 41 can be easily and reliably inserted into the mounting hole. Further, the lock claws 42*b* of the hard portion 42 can be engaged with engagement portions provided on the electronic component, thereby making it hard for the mounting insertion portion 41 to be detached from the mounting hole. Thus, the mounting insertion portion 41 can be reliably attached to the mounting hole, and it is possible to attenuate to a sufficient degree a vibration generated by the electronic component.

Fifth Embodiment (FIGS. 14A Through 14D): FIGS. 14A through 14D show a damper 43 according to a fifth embodiment of the present invention. FIG. 14A is a plan view of the damper 43, FIG. 14B is a side view of the damper 43, FIG. 14C is a sectional view, corresponding to FIG. 1C, of the damper 43, and FIG. 14D is a plan view as seen from the opposite side of FIG. 14A. The damper 43 of the fifth embodiment differs from the damper 6 of the first embodiment in the construction of a vibration attenuating portion 44. Otherwise, the fifth embodiment is of the same construction, operation, effects, and manufacturing method as the first embodiment.

Like the vibration attenuating portion 7 of the first embodiment, the vibration attenuating portion 44 elastically supports, as described below, an electronic component within an accommodating portion. It is a rubber-like elastic member of a disc configuration; it has the mounting insertion portion 8 at the center of one surface 44a thereof, and a circular recess 44c at the center of other surface 44b on the side opposite to the one surface 44a. Further, the other surface 44b has around the recess 44c a plurality of semi-spherical contact portions 44d protruding from the flat surface of the vibration attenuating portion 44 and arranged circumferentially.

The effects of the damper 43 of the fifth embodiment are described. In the damper 43, there are provided on the other surface 44b of the vibration attenuating portion 44 the contact portions 44d to be brought into contact with the accommodating portion for the electronic component, so the apparent hardness of the vibration attenuating portion 44 can be reduced, making it possible to enhance the vibration attenuating effect of the vibration attenuating portion 44. Further, because the contact area between the vibration attenuating portion 44 and the accommodating portion is reduced, it is possible to reduce the friction therebetween. Thus, the electronic component equipped with the damper 43 can be easily accommodated in the accommodating portion.

Figure 15A:
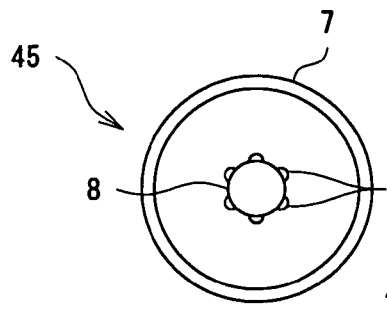
Figure 15B:
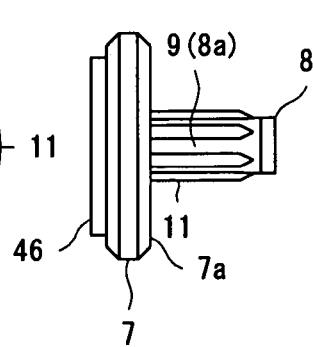
Figure 15C:
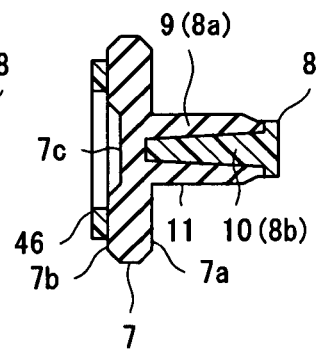
Figure 15D:
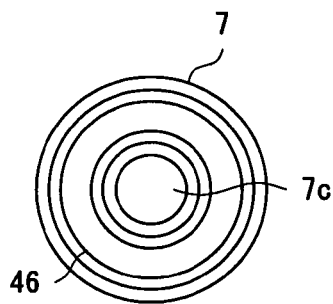

Modification of Fifth Embodiment (FIGS. 15A Through 15D): FIGS. 15A through 15D show a damper 45 according to a modification of the fifth embodiment. FIG. 15A is a plan view of the damper 45, FIG. 15B is a side view of the damper 45, FIG. 15C is a sectional view, corresponding to FIG. 1C, of the damper 45, and FIG. 15D is a plan view as seen from the opposite side of FIG. 15A. While the damper 43 of the fifth embodiment has the vibration attenuating portion 44 having on the other surface 44b thereof the contact portions 44d protruding from the flat surface of the vibration attenuating portion 44, in the damper 45 of this modification, it is possible to fix an annular contact portion 46 formed of hard resin to the other surface 7b of the vibration attenuating portion 7 of the first embodiment. With this construction, the contact portion 46 is brought into contact with the accommodating portion, so it is possible to reduce the friction therebetween. Thus, the electronic component equipped with the damper 45 can be easily accommodated in the accommodating portion.

Figure 16A:
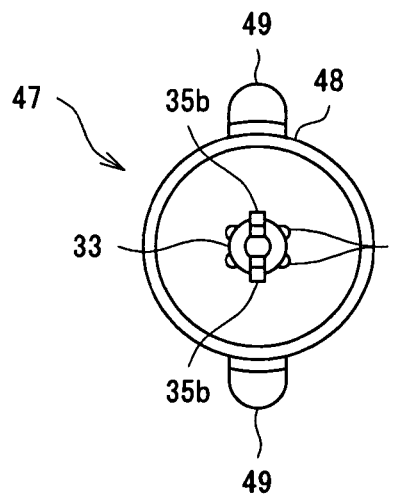
Figure 16B:
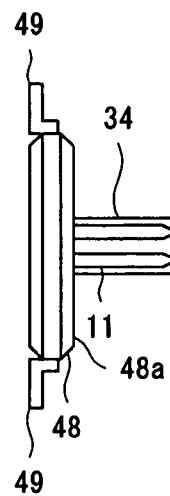
Figure 16C:
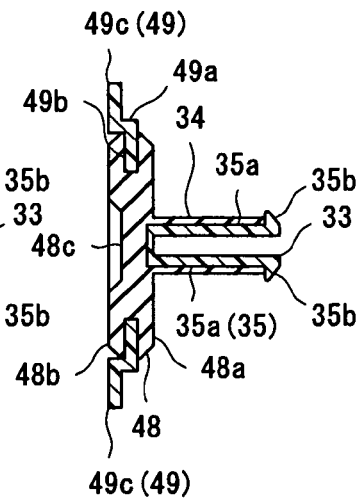

Sixth Embodiment (FIGS. 16A Through 16C): FIGS. 16A through 16C show a damper 47 according to a sixth embodiment of the present invention. FIG. 16A is a plan view of the damper 47, FIG. 16B is a side view of the damper 47, and FIG. 16C is a sectional view, corresponding to FIG. 1C, of the damper 47. The damper 47 of the sixth embodiment differs from the damper 32 of the third embodiment in that the vibration attenuating portion 48 has the protruding portions 49. Otherwise, the sixth embodiment is of the same construction, operation, effects, and manufacturing method as the third embodiment.

Like the vibration attenuating portion 7 of the third embodiment, the vibration attenuating portion 48 elastically supports an electronic component within an accommodating portion. Further, the vibration attenuating portion 48 has the same external configuration as that of the vibration attenuating portion 7 of the third embodiment; however, the vibration attenuating portion 48 is equipped with two protruding portions 49 arranged symmetrically with respect to the center thereof. The protruding portions 49 have a crank-shaped sectional configuration and have step portions 49a; one end portion 49b of each of them is embedded in the vibration attenuating portion 7, while the other end portion 49c of each of them is exposed on the other surface 7b side of the vibration attenuating portion 7. The protruding portions 49 can be brought into contact with the accommodating portion together with the vibration attenuating portion 48. While the damper 47 of the sixth embodiment is equipped with the same mounting insertion portion 33 as that of the third embodiment, it is also possible, in a modification, to provide the same mounting insertion portion 8 as that of the first embodiment.

The effects of the damper 47 of the sixth embodiment are described. In the damper 47, the protruding portions 49 are brought into contact with the interior of an electronic apparatus, so the protruding portions 49 can be used as mounting guides, making it possible to perform positioning accurately on the damper 47 with respect to the interior of the electronic apparatus. Thus, the electronic component equipped with the damper 47 can be accommodated with high positional accuracy. Further, by forming the protruding portions 49 in conformity with the configuration of the accommodating portion, the mounting to the accommodating portion is facilitated, and fixation of the damper is also possible.

Seventh Embodiment (FIGS. 17A Through 17C): FIGS. 17A through 17C show a damper 50 according to a seventh embodiment of the present invention. FIG. 17A is a plan view of the damper 50, FIG. 17B is a side view of the damper 50, and FIG. 17C is a sectional view, corresponding to FIG. 1C, of the damper 50. The damper 50 of the seventh embodiment differs from the damper 32 of the third embodiment in that the vibration attenuating portion 48 has the protruding portions 49 and a buffer portion 51. Otherwise, the seventh embodiment is of the same construction, operation, effects, and manufacturing method as the third embodiment.

Like the vibration attenuating portion 7 of the third embodiment, the vibration attenuating portion 48 elastically supports an electronic component in an accommodating portion as described below. Further, the vibration attenuating portion 48 has the same outer configuration as that of the vibration attenuating portion 7 of the third embodiment; however, the vibration attenuating portion 48 has two protruding portions 49, which are arranged symmetrically with respect to the center thereof. The protruding portions 49 have conductivity and a crank-shaped sectional configuration with step portions 49a; one end portion 49b of each protruding portion is embedded in the vibration attenuating portion 7, and the other end portion 49c thereof is exposed on the other surface 7b side of the vibration attenuating portion 7. The protruding portions 49 can be brought into contact with the accommodating portion together with the vibration attenuating portion 48. The buffer portion 51 has conductivity, has an L-shaped sectional configuration, and is thinner than the hard portion 35 and the protruding portions 49. The buffer portion 51 is connected to the base end of the hard portion 35 and one end of each protruding portion 49; the hard portion 35, the buffer portion 51, and the protruding portions 49 are integrated with each other. The buffer portion 51 is capable of attenuating vibration. When the damper 50 is attached to the electronic component, the pointed portions of the lock claws 35b formed at the forward ends of the hard portion 35 are brought into contact with the electronic component as "connecting portions".

Here, the material of the hard portion 35, the protruding portions 49, and the buffer portion 51, which have conductivity, are described. As the material of the hard portion 35, the protruding portion 49, and the buffer portion 51, it is possible to use a conductive resin having a conduction resistance of 10 $\Omega$ or less and a hardness of not less than E70 but not more than D90 as defined in JIS K 6253. When the conduction resistance exceeds 10 $\Omega$, it is impossible to attain a sufficient electrical characteristic for ground connection. When the hardness is less than E70, it is difficult to maintain the configuration of the mounting insertion portion 33; when the hardness exceeds D90, the buffer effect of the buffer portion 51 is diminished, and vibration is easily transmitted to the hard portion 35 and the protruding portions 49.

The effects of the damper 50 of the seventh embodiment are described. In the damper 50, the hard portion 35 exhibits conductivity and has the lock portions 35b to be brought into contact with an electronic component, and the vibration attenuating portion 48 has the conductive protruding portions 49 to be brought into contact with an accommodating portion for the electronic component in an electronic apparatus, and a conductive buffer portion 51 electrically connecting the hard portion 35 and the protruding portions 49 and buffering a vibration transmitted from the hard portion 35. As a result, it is possible to electrically connect the electronic component and the accommodating portion, and to connect the ground of the electronic component to the casing of the electronic apparatus via the accommodating portion. Further, between the hard portion 35 and the protruding portions 49, there is provided the buffer portion 51 buffering a vibration transmitted from the hard portion 35, so it is possible to make it hard for a vibration transmitted to the hard portion 35 to be transmitted to the accommodating portion. Thus, it is possible to attenuate to a sufficient degree a vibration generated by the electronic component while electrically connecting the electronic component and the accommodating portion.

Modification of Seventh Embodiment (FIGS. 18A Through 18C): FIGS. 18A through 18C show a damper 52 according to a modification of the seventh embodiment of the present invention. FIG. 18A is a plan view of the damper 52, FIG. 18B is a side view of the damper 52, and FIG. 18C is a sectional view, corresponding to FIG. 1C, of the damper 52. While the damper 50 of the seventh embodiment has the buffer portion 51 of an L-shaped sectional configuration, the damper 52 of this modification may have a bellows-shaped buffer portion 53. With this construction also, it is possible to attenuate to a sufficient degree a vibration generated by an electronic component while electrically connecting the electronic component and the accommodating portion.

Embodiments of Electronic Component Equipped with the Damper: As the "electronic component", a cooling fan equipped with the damper according to the present invention is described.

Figure 19:
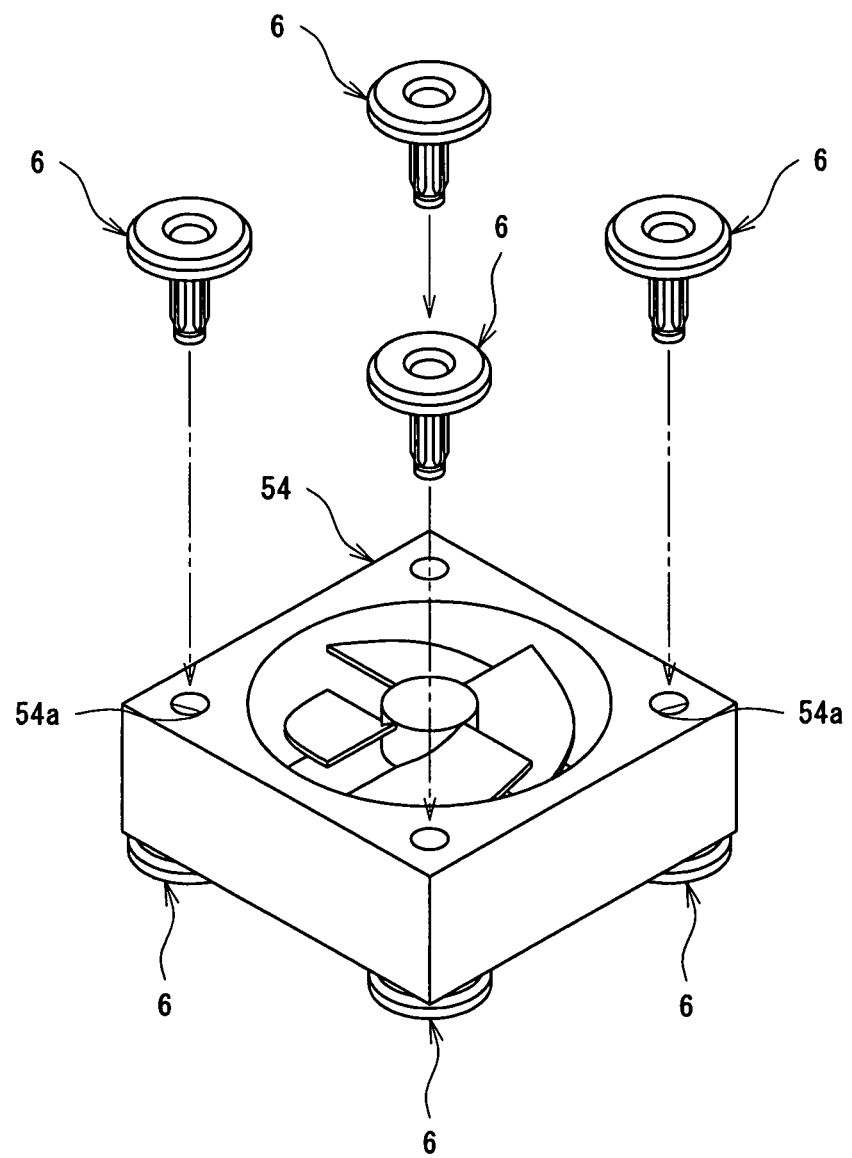
FIG. 19 is a perspective view of an electronic component equipped with a damper according to the present invention.

First Embodiment (FIGS. 19 and 20): FIGS. 19 and 20 show a cooling fan 54 according to the first embodiment of the present invention. FIG. 19 is a perspective view of the cooling fan 54, and FIG. 20 is an enlarged sectional view of the cooling fan 54. The cooling fan 54 of the first embodiment is equipped with the damper 6 described above.

In the cooling fan 54, the mounting insertion portions 8 of the dampers 6 are inserted into mounting holes 54a provided in the external surface thereof; one surface 7a of the vibration attenuating portion 7 of each damper 6 is held in intimate contact with the external surface of the cooling fan 54 to thereby fix the dampers 6 in position. Regarding the dimensional relationship between the inner diameter of the mounting holes 54a and the outer diameter of the mounting insertion portions 8 including the fitting protrusions 11 of the damper 6, it is desirable for the outer diameter of the mounting insertion portions 8 to be 1 to 1.2 times the inner diameter of the mounting holes. When the outer diameter of the mounting insertion portions is less than 1 time the inner diameter of the mounting holes, the mounting insertion portions 8 cannot be fixed in position; when the outer diameter exceeds 1.2 times the inner diameter, the mounting insertion portions 8 become rather hard to insert.

The operation of mounting the dampers 6 to the cooling fan 54 is described. The mounting insertion portions 8 of the dampers 6 are inserted into the mounting holes 54a provided in the external surface of the cooling fan 54, and one surface 7a of the vibration attenuating portion 7 of each damper 6 is brought into intimate contact with the external surface, thus attaching the dampers to the cooling fan.

The effects of the cooling fan 54 of the first embodiment are described. In the cooling fan 54, the mounting insertion portions 8 of the dampers 6 are inserted into the mounting holes 54a provided in the external surface, and the vibration attenuating portions 7 of the dampers 6 are provided on the external surface, so the mounting insertion portions 8 of the dampers 6 can be inserted easily and reliably into the mounting holes 54a formed in the cooling fan 54. Thus, it is possible to use as the damper material a soft material having a high vibration attenuating effect, making it possible for the dampers 6 to attenuate to a sufficient degree a vibration generated by the cooling fan 54. While in the first embodiment the damper 6 is adopted, it is also possible to adopt, instead of the damper 6, any one of the above-mentioned dampers 12, 14, 16, 18, 20, 22, 24, 26, 28, 32, 36, 40, 43, and 45.

Second Embodiment (FIGS. 21A and 21B): FIGS. 21A and 21B show a cooling fan 55 according to the second embodiment of the present invention. FIG. 21A is an enlarged sectional view showing a state before attachment of the damper 47 to the cooling fan 55, and FIG. 21B is an enlarged sectional view showing a state after attachment of the damper 47 to the cooling fan 55. The cooling fan 55 of the second embodiment differs from the cooling fan 54 of the first embodiment in the structure of a mounting hole 55a and in that the above-mentioned damper 47 is used. Otherwise, the second embodiment is of the same construction, effects, and mounting operation as the first embodiment.

In the cooling fan 55, an engagement groove 55b serving as an "engagement portion" is formed in the inner surface of the mounting hole 55a. The lock claws 35b of the damper 47 are locked to the engagement groove 55b, whereby the damper 47 is fixed to the cooling fan 55.

The effects of the cooling fan 55 of the second embodiment are described. In the cooling fan 55, the lock claws 35b of the damper 47 are locked to the engagement groove 55b to thereby fix the damper 47 to the cooling fan 55, so it is possible to make it hard for the damper 47 to be detached from the mounting hole 55a. Thus, the damper 47 can be reliably attached to the mounting hole 55a, making it possible for the damper 47 to attenuate to a sufficient degree a vibration generated by the cooling fan 55. While in the second embodiment the damper 47 is used, it is also possible to use, instead of the damper 47, any one of the dampers 50 and 52 described above.

Third Embodiment (FIGS. 22A and 22B): FIGS. 22A and 22B show a cooling fan 56 according to the third embodiment of the present invention. FIG. 22A is an enlarged sectional view showing a state before attachment of the damper 50 to the cooling fan 56, and FIG. 22B is an enlarged sectional view showing a state after attachment of the damper 50 to the cooling fan 56. The cooling fan 56 of the third embodiment differs from the cooling fan 55 of the second embodiment in the structure of a cooling fan 56 and in that the above-mentioned damper 50 is used. Otherwise, the third embodiment is of the same construction, effects, and mounting operation as the second embodiment.

The cooling fan 56 is provided with a mounting member 56a; the thickness dimension of the mounting member 56a is substantially equal to the height dimension of the side surface portion 33a of the mounting insertion portion 33 of the damper 50. Further, the mounting member 56a has a mounting hole 56b. Further, when the mounting insertion portion 33 of the damper 50 is inserted from one surface 56c side of the mounting member 56a, the forward end of the mounting insertion portion 33 passes through the mounting hole 56b, and the lock claws 35b of the hard portion 35 are locked, as the "engagement portion", to a hole edge 56e of the other surface 56d of the mounting member 56a, whereby it is possible to fix the damper 50 in position.

The effects of the cooling fan 56 of the third embodiment are described. In the cooling fan 56, it is possible to make it hard for the damper 50 to be detached from the mounting hole 56b, making it possible to attach the damper 50 reliably to the mounting hole 56b. Thus, it is possible to attenuate to a sufficient degree a vibration generated by the cooling fan 56. While in the third embodiment the damper 50 is used, it is also possible to use, instead of the damper 50, any one of the dampers 47 and 52 described above.

Embodiments of the Electronic Apparatus: A structure for providing the cooling fan according to the present invention as the "electronic component" in an electronic apparatus is described.

Figure 23:
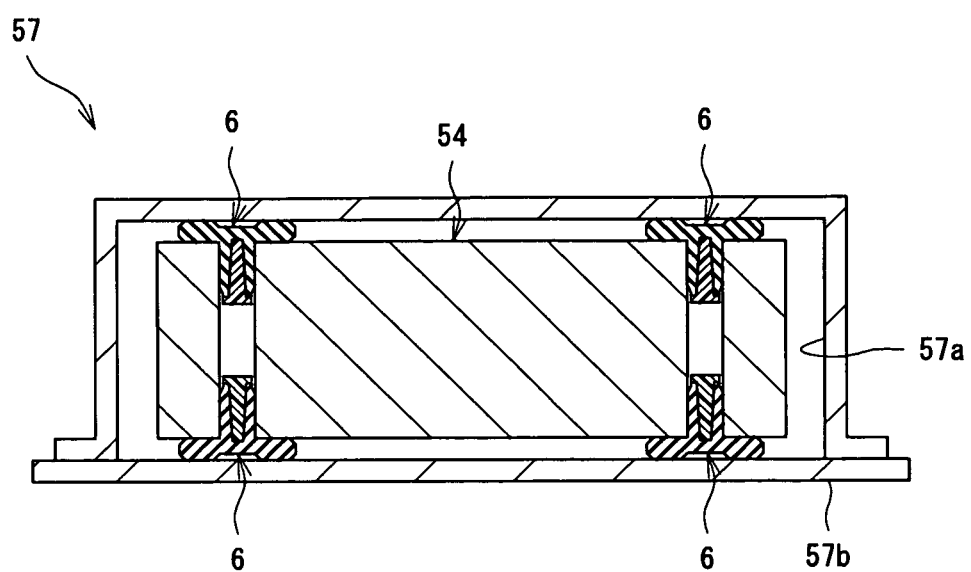
FIG. 23 is a sectional view of an electronic apparatus equipped with an electronic component with a damper according to the present invention attached thereto.

First Embodiment (FIGS. 23 and 24): FIG. 23 shows an electronic apparatus 57 according to the first embodiment of the present invention. FIG. 23 is a sectional view of an accommodating portion 57a for the electronic apparatus 57. The electronic apparatus 57 of the first embodiment is equipped with the cooling fan 54 described above.

As shown in FIG. 23, the cooling fan 54 is elastically supported by the vibration attenuating portions 7 of the dampers 6 within the accommodating portion 57a. That is, the electronic apparatus 57 has inside a casing 57b the cooling fan 54 elastically supported by the vibration attenuating portions 7 of the dampers 6. The dampers 6 are attached to the cooling fan 54 by inserting the mounting insertion portions 8 into the mounting holes 54a provided in the external surface of the cooling fan 54.

Figure 24:
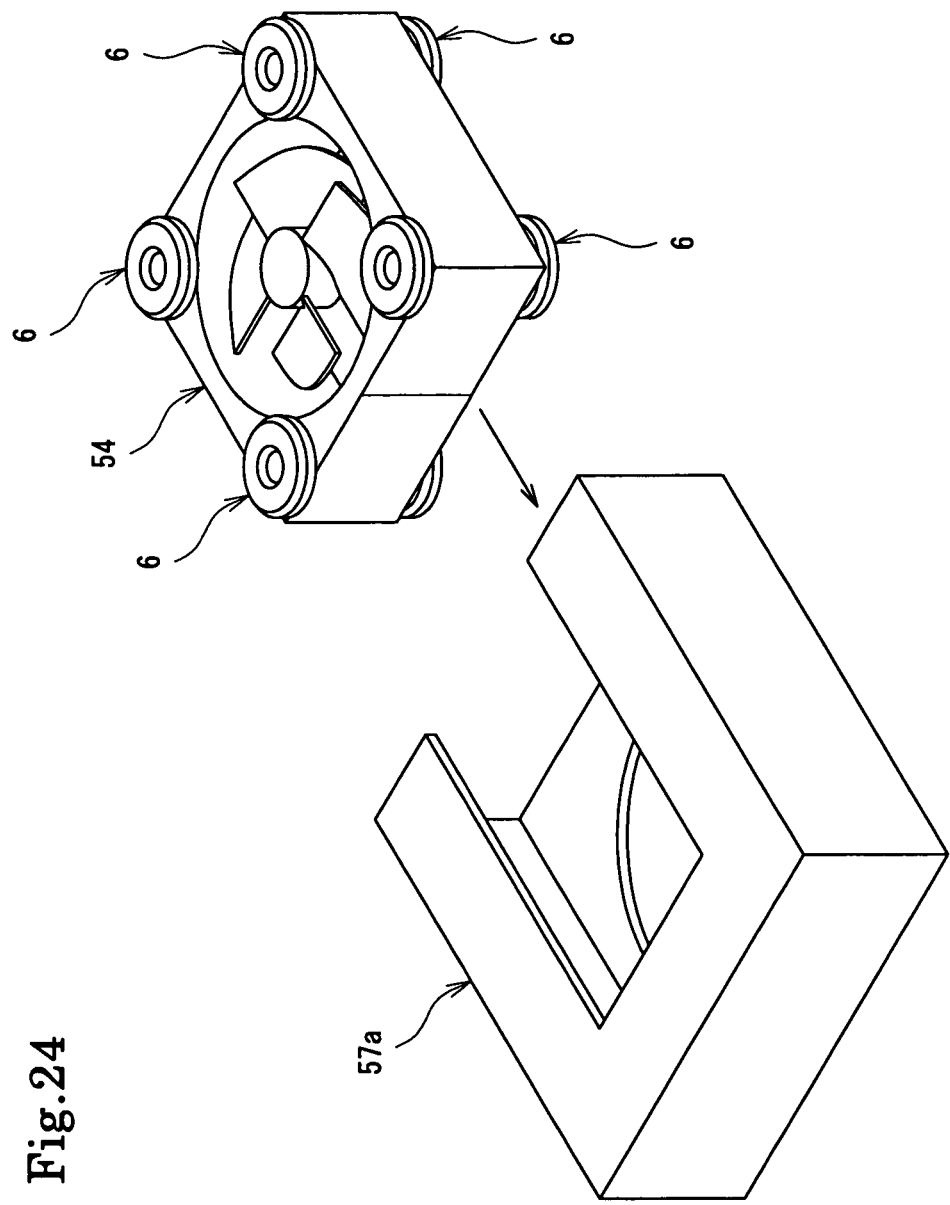
FIG. 24 is an explanatory view illustrating how the electronic component with the damper according to the present invention attached thereto is accommodated in an accommodating portion of an electronic apparatus.

As shown in FIG. 24, to accommodate the cooling fan 54 into the accommodating portion 57a, the cooling fan 54 with the dampers 6 attached thereto is caused to slide into the accommodating portion 57a. While in this embodiment the cooling fan 45 is accommodated by sliding into the box-shaped accommodating portion 57a integrated with the casing 57b, it is also possible to hold the cooling fan 54 between the casing 57b and a mounting member spaced apart therefrom, supporting the cooling fan 54 inside the electronic apparatus 57.

The effects of the electronic apparatus 57 of the first embodiment are described. In the electronic apparatus 57, the cooling fan 54 elastically supported by the vibration attenuating portions 7 of the dampers 6 is provided inside the accommodating portion 57a, so the dampers 6 can attenuate to a sufficient degree a vibration generated by the cooling fan 54, thus making it hard for the vibration of the cooling fan to be transmitted to the electronic apparatus 57. The dampers 6 are attached by the simple operation of insertion into the mounting holes 54a of the cooling fan 54. Instead of the dampers 6, it is also possible to attach the dampers 12, 14, 16, 18, 20, 22, 24, 26, 28, 32, 36, 40, 43, or 45.

Figure 25:
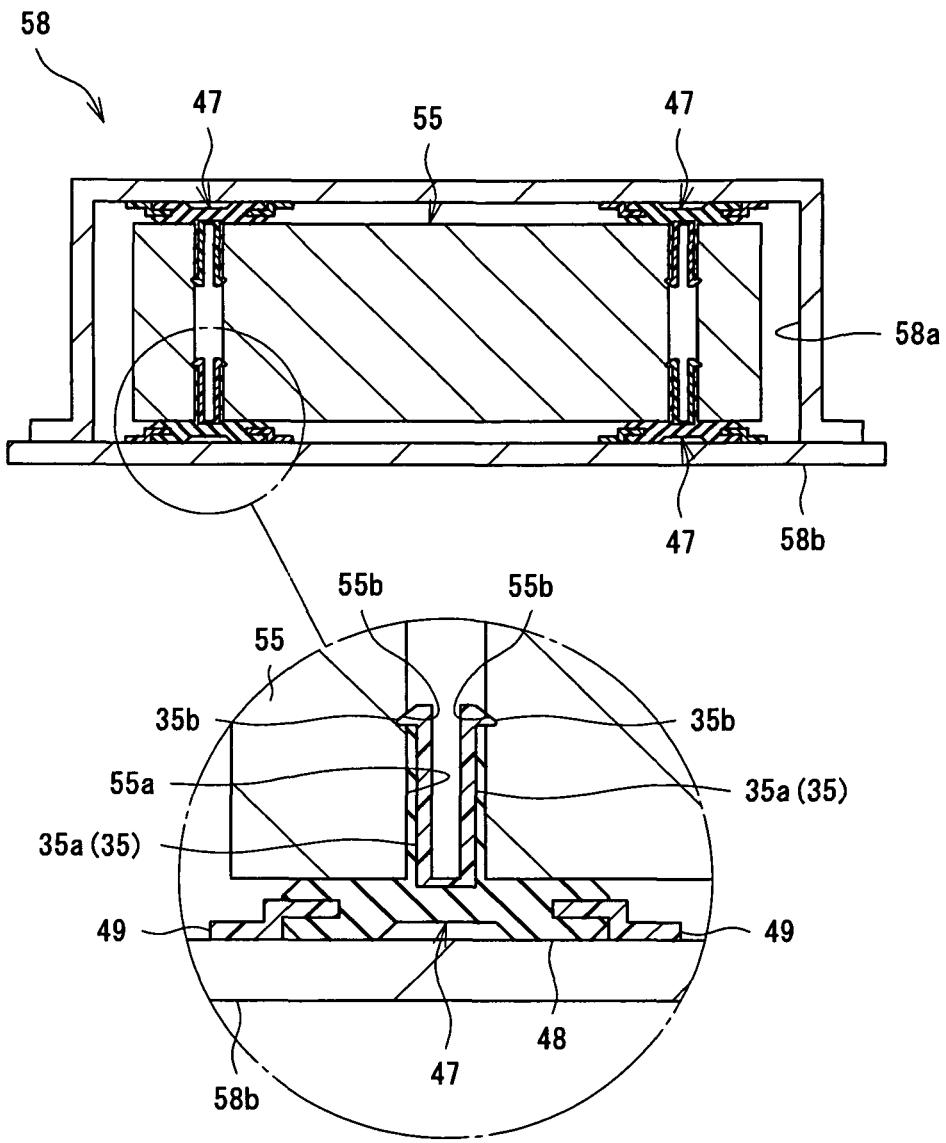
FIG. 25 is a sectional view of an electronic apparatus equipped with an electronic component with a damper according to the present invention attached thereto.

Second Embodiment (FIG. 25): FIG. 25 shows an electronic apparatus 58 according to the second embodiment of the present invention. FIG. 25 is a sectional view of an accommodating portion 58a of the electronic apparatus 58. The electronic apparatus 58 of the second embodiment differs from the electronic apparatus 57 of the first embodiment in that the cooling fan 55 with the dampers 50 attached thereto is provided. Otherwise, the second embodiment is of the same construction, effects, and accommodating method as the first embodiment.

As shown in FIG. 25, the cooling fan 55 is elastically supported within the accommodating portion 58a by the vibration attenuating portions 48 of the dampers 47. That is, the electronic apparatus 58 has within a casing 58b the cooling fan 55 elastically supported by the vibration attenuating portions 48 of the dampers 47. The dampers 47 are attached to the cooling fan 55 by inserting the mounting insertion portions 33 into mounting holes 55a provided in the external surface of the cooling fan 55. Further, the lock claws 35b of the hard portions 35 of the dampers 47 are engaged with engagement grooves 55b of the cooling fan 55. Further, the protruding portions 49 of the dampers 47 are held in contact with the accommodating portion 58a together with the vibration attenuating portions 48.

The effects of the electronic apparatus 58 of the second embodiment are described. In the electronic apparatus 58, the protruding portions 49 are held in contact with the accommodating portion 58a of the electronic apparatus 58, so it is possible to use the protruding portions 49 as mounting guides, making it possible to perform positioning accurately on the dampers 47 with respect to the accommodating portion 58a of the electronic apparatus 58. Thus, it is possible to accommodate with high positional accuracy the cooling fan 55 with the dampers 47 attached thereto. It is also possible to directly fix the protruding portions 49 to the accommodating portion 58a by mounting screws (not shown). Further, instead of the dampers 47, it is also possible to attach the dampers 50 or 52.

Figure 26:
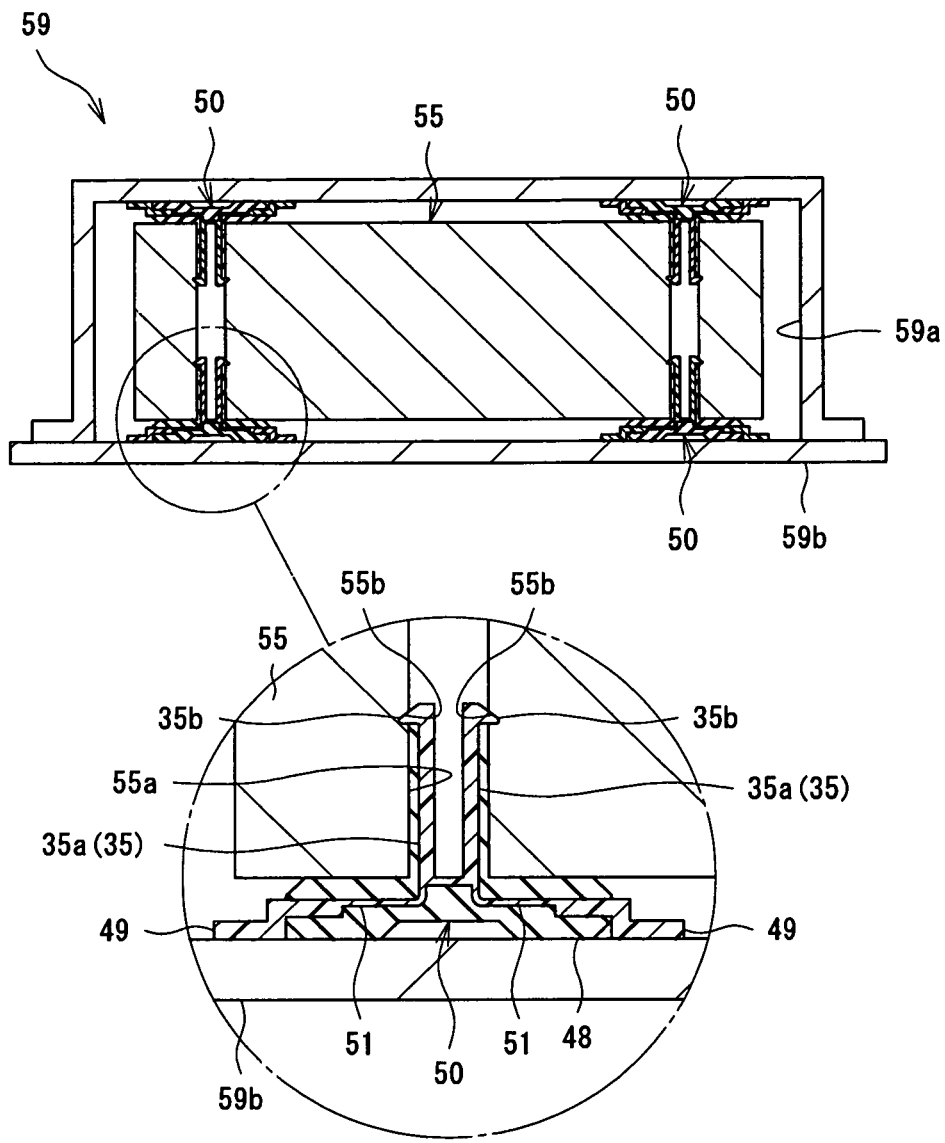
FIG. 26 is a sectional view of an electronic apparatus equipped with an electronic component with a damper according to the present invention attached thereto.

Third Embodiment (FIG. 26): FIG. 26 shows an electronic apparatus 59 according to the third embodiment of the present invention. FIG. 26 is a sectional view of an accommodating portion 59a of the electronic apparatus 59. The electronic apparatus 59 of the third embodiment differs from the electronic apparatus 57 of the first embodiment in that a cooling fan 55 with the dampers 50 attached thereto is provided. Otherwise, the third embodiment is of the same construction, effects, and accommodating method as the first embodiment.

As shown in FIG. 26, the cooling fan 55 is elastically supported within the accommodating portion 59a by the vibration attenuating portions 48 of the dampers 50. That is, the electronic apparatus 59 has within a casing 59b the cooling fan 55 elastically supported by the vibration attenuating portions 48 of the dampers 50. The dampers 50 are attached to the cooling fan 55 by inserting the mounting insertion portions 33 into mounting holes 55a provided in the external surface of the cooling fan 55. Further, the lock claws 35b of the hard portions 35 of the dampers 50 are engaged with engagement grooves 55b of the cooling fan 55 as "connecting portions", and are held in contact with the cooling fan 55. Further, the protruding portions 49 of the dampers 50 are held in contact with the accommodating portion 59a together with the vibration attenuating portions 48. In this way, the hard portions 35, the buffer portions 51, and the protruding portions 49 form connecting members electrically connecting the cooling fan 55 and the accommodating portion 59a to each other.

The effects of the electronic apparatus 59 of the third embodiment are described. In the electronic apparatus 59, the hard portions 35, the buffer portions 51, and the protruding portions 49 form connecting members to electrically connect the cooling fan 55 and the accommodating portion 59a to each other, so it is possible to connect the ground of the cooling fan 55 to the casing 59b of the electronic apparatus via the casing 59b of the electronic apparatus 59. Further, because the connecting members include the buffer portions 51 for buffering vibration, it is possible to make it hard for a vibration of the cooling fan 55 to be transmitted to the accommodating portion 59a via the connecting members. Thus, it is possible for the dampers 50 to attenuate to a sufficient degree a vibration generated by the cooling fan 55 while electrically connecting the cooling fan 55 and the accommodating portion 59a to each other. The dampers 50 are attached by the simple operation of insertion into the mounting holes 55a of the cooling fan 55. Instead of the dampers 50, it is also possible to attach the dampers 52.

Figure 27:
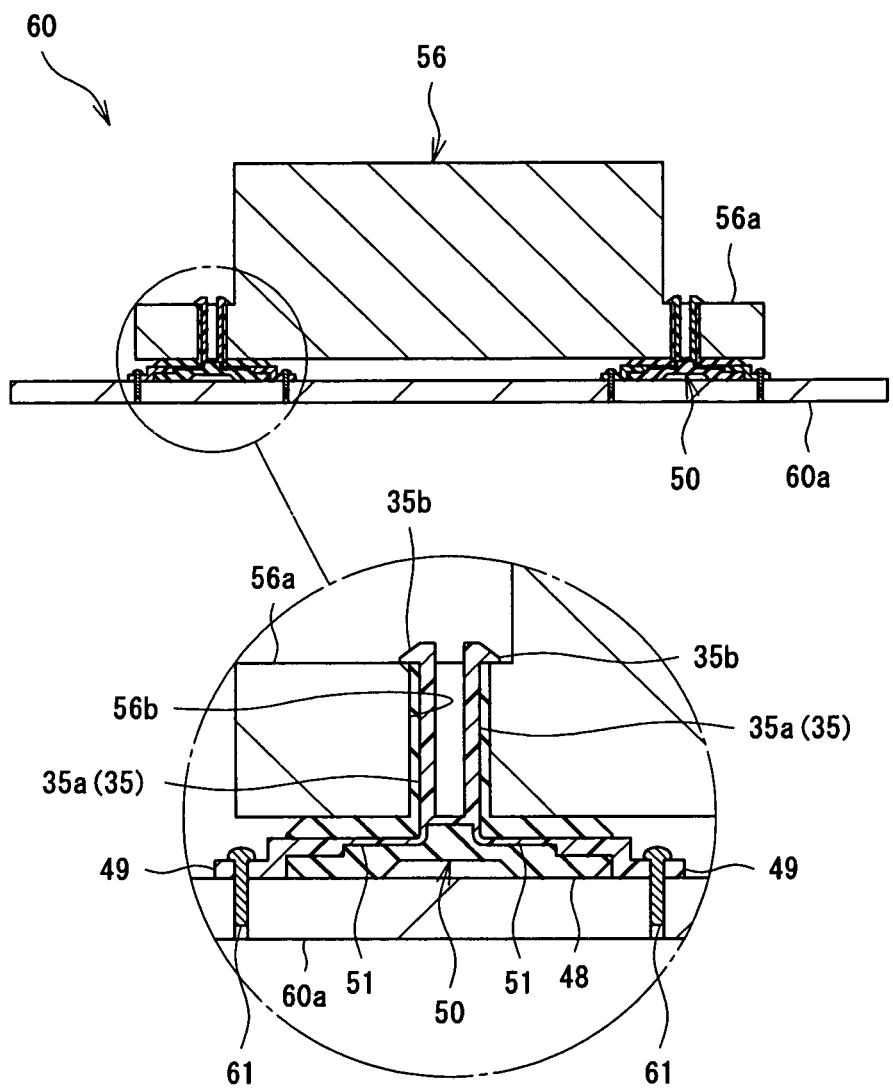
FIG. 27 is a sectional view of an electronic apparatus equipped with an electronic component with a damper according to the present invention attached thereto.
Figures 28A, 28B, 28C:
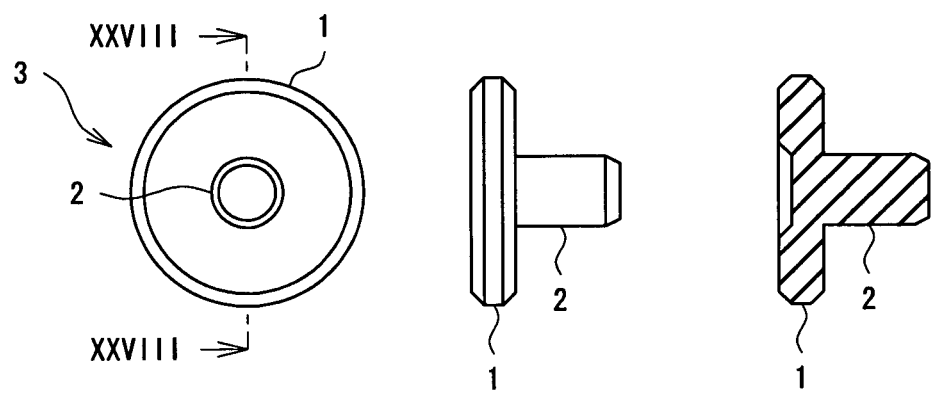
Figure 29:
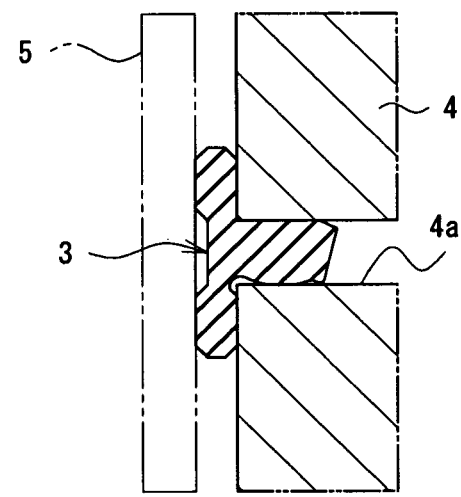
FIG. 29 is an enlarged sectional view of an electronic apparatus equipped with an electronic component with the conventional damper attached thereto.

Fourth Embodiment (FIG. 27): FIG. 27 shows an electronic apparatus 60 according to the fourth embodiment of the present invention. FIG. 27 is a sectional view of the electronic apparatus 60. The electronic apparatus 60 of the fourth embodiment differs from the electronic apparatus 59 of the third embodiment in that the cooling fan 56 and the electronic apparatus 60 are provided. Otherwise, the fourth embodiment is of the same construction and effects as the third embodiment.

As shown in FIG. 27, the cooling fan 56 is elastically supported by the vibration attenuating portions 48 of the dampers 50 within a casing 60a. That is, the electronic apparatus 60 has within the casing 60a the cooling fan 56 elastically supported by the vibration attenuating portions 48 of the dampers 50. The dampers 50 are attached to the cooling fan 56 by inserting the mounting insertion portions 33 into mounting holes 56b provided in mounting members 56a of the cooling fan 56. Further, the lock claws 35b of the hard portions 35 of the dampers 50 are held in contact with the mounting members 56a of the cooling fan 56. The protruding portions 49 of the dampers 50 are held in contact with the casing 60a together with the vibration attenuating portions 48. In this way, the hard portions 35, the buffer portions 51, and the protruding portions 49 form connecting members electrically connecting the cooling fan 56 and the casing 60a to each other. Further, the protruding portions 49 are directly fixed to the casing 60a by mounting screws 61.

The effect of the electronic apparatus 60 of the fourth embodiment is described. In the electronic apparatus 60, the cooling fan 56 is elastically supported by the dampers 50 fixed to the casing 60a by the mounting screws 61, so it is possible to fix the cooling fan 56 to the electronic apparatus 60 without having to provide an accommodating portion as described above. Instead of the dampers 50, it is also possible to attach the dampers 52.

EXAMPLES

Next, the present invention is described in more detail with reference to the following specific examples.

Example 1

A bar-shaped hard portion (10) was formed of polypropylene by two-color molding, and then a soft portion (9) and a vibration attenuating portion (7) in the periphery of the hard portion (10) were formed of a styrene type thermoplastic elastomer (hardness: JIS K6253 E30; tan δ=0.08 (23° C.)) such that the hard portion (10) is situated at the center of a mounting insertion portion (8), thus obtaining a damper of Specimen 1 of the configuration as shown in FIGS. 3A through 3C. On the other hand, a damper of Specimen 2 of the same configuration and size as the damper of Specimen 1 was formed solely of a styrene type thermoplastic elastomer (hardness: JIS K 6253 E30; tan δ=0.08 (23° C.)).

An attempt was made to mount, one at a time, the damper of Specimen 1 and the damper of Specimen 2 to one of the mounting holes (54a) of a cooling fan (54); in the damper of Specimen 2, the mounting insertion portion underwent deformation, and was hard to insert into the mounting hole (54a), whereas, in the damper of Specimen 1, the mounting insertion portion (8) was not easily deformed and could be easily inserted.

Example 2

A damper of the same configuration as the damper of Specimen 1 produced in Example 1 was produced as follows. First, using a two component setting type bisphenol A epoxy resin (828 and curing agent ST11 manufactured by Japan Epoxy Resin, Co., Ltd.), the hard portion (10) was formed. Next, the hard portion (10) was inserted into a mold for the vibration attenuating portion (7) and the soft portion (9), and press molding was performed using butyl rubber (hardness: JIS K6253 E50). In this way, a damper of Specimen 3 was obtained. The damper of Specimen 3 could also be easily mounted to the same mounting hole (54a) of the cooling fan (54) as used in Example 1.

Example 3

A silicone gel ("CY 52-276 A/B" manufactured by Dow Coning Toray Co., Ltd.) was poured into a mold to form a vibration attenuating portion (7) and a soft portion (9) having a hardness of JIS K6253 E0. Apart from this, a bar-shaped hard portion (10) was formed of polypropylene. The hard portion (10) was integrated with the vibration attenuating portion (7) and the soft portion (9) by adhesive, thus obtaining a damper of Specimen 4 of the configuration shown in FIG. 13 having a mounting insertion portion (41) whose outer diameter at the position of the lock claws (42b) was the same as the outer diameter of the mounting insertion portion (8) of Specimen 1. The damper of Specimen 4 could also be easily mounted to the same mounting hole (54a) of the cooling fan (54) as used in Example 1.

Example 4

Fitting protrusions (11) including the soft portion (9) and having a height of 0.7 mm were provided on the surface of a mounting insertion portion (8) having at its center a hard portion (10) of an outer diameter of φ1.8 mm. In this way, there was obtained a damper of Specimen 5 as shown in FIGS. 1A through 1C whose mounting insertion portion (8) inclusive of the fitting protrusions (11) exhibited an outer diameter of 4.4 mm. Further, there was obtained a damper of Specimen 6 as shown in FIGS. 3A through 3C equipped with a mounting insertion portion (8) which exhibited an outer diameter of φ4.4 mm, which had at its center a hard portion (10) of φ1.8 mm, and whose surface portion was formed by the soft portion (9).

The damper of Specimen 5 and the damper of Specimen 6 were inserted into mounting holes (54a) having hole diameters of φ4.4 mm, φ4.2 mm, φ4.0 mm, φ3.8 mm, and φ3.6 mm. The results attained are as follows: The damper of Specimen 5 shown in FIGS. 1A through 1C could be easily mounted to all the holes except for the one having a diameter of φ3.6 mm, and were not easily detached therefrom; it was rather difficult to insert the damper into the hole having a hole diameter of φ3.6 mm. On the other hand, the damper of Specimen 6 shown in FIGS. 3A through 3C could be easily mounted to the holes whose hole diameters were φ4.4 mm and φ4.2 mm, and were not easily detached therefrom; in the case of the holes whose hole diameter was φ4.0 mm or less, the damper was rather hard to insert.

Example 5

There was obtained a damper of Specimen 7 as shown in FIGS. 14A through 14D which had a vibration attenuating portion (44) of a diameter of φ15 mm and a thickness of 3.5 mm and which exhibited, on a surface (44b) thereof to be brought into contact with a casing, six semi-spherical contact portions (44d) having a radius of 1.5 mm and arranged circumferentially. On the other hand, there was obtained a damper of Specimen 8 as shown in FIGS. 1A through 1C which was of the same configuration and size as the damper of Specimen 7 except that it had no contact portions (44d).

A vibration test was conducted on the dampers of Specimen 7 and Specimen 8 (Test conditions: eight dampers of Specimen 7 or eight dampers of Specimen 8 were attached to a cooling fan (54) having a weight of 100 g, and the cooling fan (54) was fixed in a compressed state to a pedestal such that the thickness of the vibration attenuating portions (44) was 2.5 mm. This pedestal was vibrated at an acceleration of 1 G and a frequency of 10 Hz to 200 Hz, and the value of an acceleration sensor attached to the cooling fan (54) was measured to obtain the vibration transmission rate and to evaluate the resonance frequency $f_0$.) In the dampers of Specimen 8, the resonance frequency $f_0$ was 120 Hz. In the dampers of Specimen 7, the resonance frequency $f_0$ was 70 Hz. Those results proved that the dampers of Specimen 7 help to enhance the vibration-proof characteristic with respect to high-frequency vibration.

Example 6

There was obtained a damper of Specimen 9 as shown in FIGS. 17A through 17C whose hard portion (35) was equipped with lock claws (35b) and whose vibration attenuating portion (48) was equipped with protruding portions (49) and a buffer portion (51). As shown in FIG. 26, dampers of Specimen 9 were respectively attached to four end positions of a cooling fan (55), with the lock claws (35b) of the dampers of Specimen 9 being engaged with engagement grooves (55b) of the cooling fan (55). Further, the cooling fan (55) was fixed to a casing by mounting screws. This enabled static electricity generated in the cooling fan (55) to escape to the casing.

Example 7

There was obtained a damper of Specimen 10 of a configuration as shown in FIGS. 3A through 3C whose vibration attenuating portion was formed of a styrene type TPE (hardness: JIS K6253 E60). The damper of Specimen 10 was rather inadequate in terms of vibration damping property for the cooling fan.

Example 8

There was obtained a damper of Specimen 11 of a configuration as shown in FIGS. 3A through 3C whose hard portion was formed of a styrene type TPE (hardness: JIS K6253 E60). In the damper of Specimen 11, the hard portion did not have a sufficient strength, so the mounting insertion portion was subject to bending at the time of insertion into the cooling fan; thus, while the damper of Specimen 11 was easier to insert than a damper with no hard portion, the damper of Specimen 11 was harder to insert than the damper of Specimen 1.

What is claimed is:

1. A damper comprising:
   a vibration attenuating portion formed of an elastic material; and
   a mounting insertion portion protruding from the vibration attenuating portion, with the mounting insertion portion for insertion into a mounting hole formed in an electronic component generating a vibration within an electronic apparatus, to thereby elastically support the electronic component,
   wherein the vibration attenuating portion has a first surface and a second surface opposite to the first surface, the mounting insertion portion attaches to a center of the first surface, the second surface has a recess in a center of the second surface, and
   wherein the mounting insertion portion comprises
      a hard portion forming a central portion in a columnar configuration which maintains a configuration of the mounting insertion portion, the hard portion exhibiting an E-hardness of 70 or more, and
      a soft portion surrounding annularly the central portion, the soft portion being continuous with the vibration attenuating portion and exhibiting an E-hardness of 50 or less so that the soft portion is compressible when inserted into the mounting hole.

2. A damper according to claim 1, wherein the soft portion forms an external side surface of the mounting insertion portion.

3. A damper according to claim 1, wherein the mounting insertion portion has a fitting protrusion provided on a side surface.

4. A damper according to claim 3, wherein the fitting protrusion is formed as a ridge-like swelling continuous in an inserting direction thereof.

5. A damper according to claim 3, wherein the fitting protrusion is formed as a semi-spherical swelling.

6. A damper according to claim 1, wherein the hard portion is partially exposed outside on a side surface of the mounting insertion portion.

7. A damper according to claim 1, wherein the hard portion partially forms a side surface of the mounting insertion portion.

8. A damper according to claim 1, wherein the hard portion has higher rigidity than that of the vibration attenuating portion.

9. A damper according to claim 1, wherein the hard portion has a lock portion to be engaged with an engagement portion provided in the electronic component.

10. A damper according to claim 1, wherein the vibration attenuating portion has, on a surface on an opposite side of a surface having the mounting insertion portion, a contact portion to be brought into contact with an interior of the electronic apparatus.

11. A damper according to claim 10, wherein the contact portion is formed of a hard resin.

12. A damper according to claim 1, wherein the vibration attenuating portion has a protruding portion to be brought into contact with an interior of the electronic apparatus.

13. A damper according to claim 1, wherein the hard portion exhibits conductivity and has a connecting portion to be brought into contact with the electronic component, and wherein the vibration attenuating portion has a conductive protruding portion to be brought into contact with an interior of the electronic apparatus and a conductive buffer portion electrically connecting the hard portion and the protruding portion to each other and buffering a vibration transmitted from the hard portion.

14. An electronic component generating a vibration inside an electronic apparatus, comprising a vibration attenuating portion of the damper according to claim 1 provided on an external surface with a mounting insertion portion of the damper being inserted into a mounting hole formed in the external surface.

15. An electronic apparatus comprising an electronic component generating a vibration inside a casing, wherein a mounting insertion portion of the damper according to claim 1 is inserted into a mounting hole provided in an external surface, to thereby attach the damper, and wherein the electronic component elastically supported by a vibration attenuating portion of the damper is provided inside the casing.

16. A damper according to claim 1, wherein the mounting insertion portion is solid.

17. A damper according to claim 1, wherein the vibration attenuating portion is a disc-like configuration.

18. A damper according to claim 17, wherein the soft portion extends from the vibration attenuating portion.

19. A damper according to claim 1, wherein the vibration attenuating portion is inserted between the electronic component and the electronic apparatus.

20. A damper according to claim 1, the hard portion tapers towards the vibration attenuating portion.

21. A damper comprising:
a vibration attenuating portion without a through hole formed of an elastic material; and
a mounting insertion portion protruding from the vibration attenuating portion, with the mounting insertion portion for insertion into a mounting hole formed in an electronic component generating a vibration within an electronic apparatus, to thereby elastically support the electronic component,
wherein the vibration attenuating portion has a first surface and a second surface opposite to the first surface, the mounting insertion portion attaches to a center of the first surface, the second surface has a recess in a center of the second surface, and
wherein the mounting insertion portion comprises
a hard portion forming a central portion in a columnar configuration which maintains a configuration of the mounting insertion portion, and
a soft portion surrounding annularly the central portion, the soft portion being continuous with the vibration attenuating portion.

* * * * *